(12) United States Patent
Miyahara

(10) Patent No.: US 8,786,904 B2
(45) Date of Patent: Jul. 22, 2014

(54) IMAGE PROCESSING APPARATUS, IMAGE OUTPUT SYSTEM, IMAGE PROCESSING CONTROL METHOD AND COMPUTER READABLE INFORMATION RECORDING MEDIUM

(71) Applicant: Seiji Miyahara, Kanagawa (JP)

(72) Inventor: Seiji Miyahara, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 27 days.

(21) Appl. No.: 13/718,128

(22) Filed: Dec. 18, 2012

(65) Prior Publication Data

US 2013/0163012 A1 Jun. 27, 2013

(30) Foreign Application Priority Data

Dec. 21, 2011 (JP) ................................ 2011-279231

(51) Int. Cl.
*H04N 1/60* (2006.01)
*G06K 15/00* (2006.01)
(52) U.S. Cl.
USPC .......... 358/1.9; 358/448; 358/1.15; 358/1.16; 358/401; 358/1.18; 382/162
(58) Field of Classification Search
None
See application file for complete search history.

(56) References Cited

U.S. PATENT DOCUMENTS 6,549,654 B1 * 4/2003 Kumada ........................ 382/162
7,369,263 B2 * 5/2008 Azami ......................... 358/1.16

FOREIGN PATENT DOCUMENTS

JP H11-313216 11/1999
JP 2002-252785 9/2002

* cited by examiner

*Primary Examiner* — Quang N Vo
(74) *Attorney, Agent, or Firm* — Harness, Dickey & Pierce, P.L.C.

(57) ABSTRACT

Color gamuts of output images based on image output methods of plural image output apparatuses and output media are stored. Plural sets of color reference data for associating a color gamut of the image output request apparatus with color gamuts of output images of the image output apparatuses are stored. It is determined whether an output of image data from the image output request apparatus by one of the image output apparatuses is possible. When it is not possible, another one of the image output apparatuses is determined. A preview image and image data for outputting are generated corresponding to the determined one of the image output apparatuses based on the image data, the profile information of the determined one of the image output apparatuses and the color reference data.

7 Claims, 14 Drawing Sheets

| | C | M | Y | K | L | a | b |
|---|---|---|---|---|---|---|---|
| R | 0 | 100 | 100 | 0 | 47 | 68 | 48 |
| Y | 0 | 0 | 100 | 0 | 89 | -5 | 93 |
| G | 100 | 0 | 100 | 0 | 50 | -65 | 27 |
| C | 100 | 0 | 0 | 0 | 55 | -37 | -50 |
| B | 100 | 100 | 0 | 0 | 24 | 22 | -46 |
| M | 0 | 100 | 0 | 0 | 48 | 71 | -3 |

Gm1

| | C | M | Y | K | L | a | b |
|---|---|---|---|---|---|---|---|
| R | 0 | 100 | 100 | 0 | 48.78 | 52.98 | 31.98 |
| Y | 0 | 0 | 100 | 0 | 80.3 | -3.44 | 72.41 |
| G | 100 | 0 | 100 | 0 | 48.81 | -46.17 | 20.39 |
| C | 100 | 0 | 0 | 0 | 54.61 | -29.12 | -34.92 |
| B | 100 | 100 | 0 | 0 | 33.31 | 11.04 | -32.75 |
| M | 0 | 100 | 0 | 0 | 50.33 | 57.16 | -2.75 |

|   |   | C | M | Y | K | L | a | b |
|---|---|---|---|---|---|---|---|---|
| R |   | 0 | 100 | 100 | 0 | 53.84 | 56.08 | 29.87 |
| Y |   | 0 | 0 | 100 | 0 | 89.12 | -2.54 | 77.07 |
| G |   | 100 | 0 | 100 | 0 | 53.84 | -43.42 | 17.08 |
| C |   | 100 | 0 | 0 | 0 | 59.72 | -25.96 | -44.44 |

Om1

|   |   | C | M | Y | K | L | a | b |
|---|---|---|---|---|---|---|---|---|
| B |   |   |   |   |   |   |   |   |
| M | R | 0 | 100 | 100 | 0 | 53.84 | 56.08 | 29.87 |
|   | Y | 0 | 0 | 100 | 0 | 89.12 | -2.54 | 77.07 |
|   | G | 100 | 0 | 100 | 0 | 53.84 | -43.42 | 17.08 |
|   | C | 100 | 0 | 0 | 0 | 59.72 | -25.96 | -44.44 |

Om2

|   |   | C | M | Y | K | L | a | b |
|---|---|---|---|---|---|---|---|---|
| B |   |   |   |   |   |   |   |   |
| M | R | 0 | 100 | 100 | 0 | 53.84 | 56.08 | 29.87 |
|   | Y | 0 | 0 | 100 | 0 | 89.12 | -2.54 | 77.07 |
|   | G | 100 | 0 | 100 | 0 | 53.84 | -43.42 | 17.08 |
|   | C | 100 | 0 | 0 | 0 | 59.72 | -25.96 | -44.44 |
|   | B | 100 | 100 | 0 | 0 | 37.55 | 10.76 | -31.49 |
|   | M | 0 | 100 | 0 | 0 | 55.65 | 61.88 | -1.5 |

|   | C | M | Y | K | L | a | b |
|---|---|---|---|---|---|---|---|
| R | 0 | 100 | 100 | 0 | 53.84 | 56.08 | 29.87 |
| Y | 0 | 0 | 100 | 0 | 89.12 | -2.54 | 77.07 |
| G | 100 | 0 | 100 | 0 | 53.84 | -43.42 | 17.08 |
| C | 100 | 0 | 0 | 0 | 59.72 | -25.96 | -44.44 |

Om4

|   |   | C | M | Y | K | L | a | b |
|---|---|---|---|---|---|---|---|---|
| B |   |   |   |   |   |   |   |   |
| M | R | 0 | 100 | 100 | 0 | 53.84 | 56.08 | 29.87 |
|   | Y | 0 | 0 | 100 | 0 | 89.12 | -2.54 | 77.07 |
|   | G | 100 | 0 | 100 | 0 | 53.84 | -43.42 | 17.08 |
|   | C | 100 | 0 | 0 | 0 | 59.72 | -25.96 | -44.44 |

Om5

|   |   | C | M | Y | K | L | a | b |
|---|---|---|---|---|---|---|---|---|
| B |   |   |   |   |   |   |   |   |
| M | R | 0 | 100 | 100 | 0 | 53.84 | 56.08 | 29.87 |
|   | Y | 0 | 0 | 100 | 0 | 89.12 | -2.54 | 77.07 |
|   | G | 100 | 0 | 100 | 0 | 53.84 | -43.42 | 17.08 |
|   | C | 100 | 0 | 0 | 0 | 59.72 | -25.96 | -44.44 |
|   | B | 100 | 100 | 0 | 0 | 37.55 | 10.76 | -31.49 |
|   | M | 0 | 100 | 0 | 0 | 55.65 | 61.88 | -1.5 |

Oma:

| C | M | Y | K | L | a | b |
|---|---|---|---|---|---|---|
| 0 | 0 | 0 | 0 | 97 | 1 | −4 |
| 0 | 20 | 0 | 0 | 91.56 | 8.79 | −6.69 |
| 0 | 40 | 0 | 0 | 86.61 | 15.8 | −8.7 |
| 0 | 60 | 0 | 0 | 81.76 | 22.75 | −10.15 |
| 0 | 80 | 0 | 0 | 76.95 | 29.84 | −11.2 |
| 0 | 100 | 0 | 0 | 69.52 | 41.37 | −12.17 |
| 0 | 100 | 0 | 20 | 61.71 | 53.99 | −12.37 |
| 0 | 100 | 0 | 40 | 54.13 | 66.7 | −11.86 |
| 0 | 100 | 0 | 60 | 48.25 | 76.75 | −11.18 |
| 0 | 100 | 0 | 80 | 92.99 | −2.75 | −9.6 |
| 100 | 100 | 100 | 100 | 87.97 | 5.13 | −11.55 |

Omb:

| C | M | Y | K | L | a | b |
|---|---|---|---|---|---|---|
| 0 | 0 | 0 | 0 | 97 | 1 | −4 |
| 0 | 20 | 0 | 0 | 91.56 | 8.79 | −6.69 |
| 0 | 40 | 0 | 0 | 86.61 | 15.8 | −8.7 |
| 0 | 60 | 0 | 0 | 81.76 | 22.75 | −10.15 |
| 0 | 80 | 0 | 0 | 76.95 | 29.84 | −11.2 |
| 0 | 100 | 0 | 0 | 69.52 | 41.37 | −12.17 |
| 0 | 100 | 0 | 20 | 61.71 | 53.99 | −12.37 |
| 0 | 100 | 0 | 40 | 54.13 | 66.7 | −11.86 |
| 0 | 100 | 0 | 60 | 48.25 | 76.75 | −11.18 |
| 0 | 100 | 0 | 80 | 92.99 | −2.75 | −9.6 |

Omc:

| C | M | Y | K | L | a | b |
|---|---|---|---|---|---|---|
| 0 | 0 | 0 | 0 | 97 | 1 | −4 |
| 0 | 20 | 0 | 0 | 91.56 | 8.79 | −6.69 |
| 0 | 40 | 0 | 0 | 86.61 | 15.8 | −8.7 |
| 0 | 60 | 0 | 0 | 81.76 | 22.75 | −10.15 |
| 0 | 80 | 0 | 0 | 76.95 | 29.84 | −11.2 |
| 0 | 100 | 0 | 0 | 69.52 | 41.37 | −12.17 |
| 0 | 100 | 0 | 20 | 61.71 | 53.99 | −12.37 |
| 0 | 100 | 0 | 40 | 54.13 | 66.7 | −11.86 |
| 0 | 100 | 0 | 60 | 48.25 | 76.75 | −11.18 |
| 0 | 100 | 0 | 80 | 92.99 | −2.75 | −9.6 |
| 100 | 100 | 100 | 100 | 87.97 | 5.13 | −11.55 |
| 0 | 0 | 0 | 0 | 83.21 | 12.13 | −13.17 |
| 0 | 20 | 20 | 0 | 78.49 | 19.03 | −14.48 |
| 0 | 40 | 40 | 0 | 73.81 | 26.04 | −15.49 |
| 0 | 55 | 55 | 0 | 66.56 | 37.36 | −16.41 |
| 0 | 85 | 85 | 0 | 58.93 | 49.78 | −16.68 |
| 0 | 100 | 100 | 0 | 51.48 | 62.29 | −16.34 |
| 0 | 100 | 100 | 20 | 45.74 | 72.16 | −15.76 |
| 0 | 100 | 100 | 40 | 89.08 | −6.35 | −14.72 |
| 0 | 100 | 100 | 60 | 84.33 | 1.54 | −16.19 |
| 0 | 100 | 100 | 80 | 79.77 | 8.58 | −17.48 |
| 100 | 100 | 100 | 100 | 75.21 | 15.46 | −18.6 |
| 0 | 0 | 0 | 0 | 70.63 | 22.38 | −19.51 |
| 0 | 0 | 20 | 0 | 63.54 | 33.51 | −20.42 |
| 0 | 0 | 40 | 0 | 56.07 | 45.78 | −20.75 |
| 0 | 0 | 60 | 0 | 48.78 | 58.09 | −20.57 |
| ... | ... | ... | ... | ... | ... | ... |

FIG.5B

| C | M | Y | K | L | a | b |
|---|---|---|---|---|---|---|
| 0 | 0 | 0 | 0 | 97 | 1 | −4 |
| 0 | 20 | 0 | 0 | 91.56 | 8.79 | −6.69 |
| 0 | 40 | 0 | 0 | 86.61 | 15.8 | −8.7 |
| 0 | 60 | 0 | 0 | 81.76 | 22.75 | −10.15 |
| 0 | 80 | 0 | 0 | 76.95 | 29.84 | −11.2 |
| 0 | 100 | 0 | 0 | 69.52 | 41.37 | −12.17 |
| 0 | 100 | 0 | 20 | 61.71 | 53.99 | −12.37 |
| 0 | 100 | 0 | 40 | 54.13 | 66.7 | −11.86 |
| 0 | 100 | 0 | 60 | 48.25 | 76.75 | −11.18 |
| 0 | 100 | 0 | 80 | 92.99 | −2.75 | −9.6 |
| 100 | 100 | 100 | 100 | 87.97 | 5.13 | −11.55 |
| 0 | 0 | 0 | 0 | 83.21 | 12.13 | −13.17 |
| 0 | 20 | 20 | 0 | 78.49 | 19.03 | −14.48 |
| 0 | 40 | 40 | 0 | 73.81 | 26.04 | −15.49 |
| 0 | 55 | 55 | 0 | 66.56 | 37.36 | −16.41 |
| 0 | 85 | 85 | 0 | 58.93 | 49.78 | −16.68 |
| 0 | 100 | 100 | 0 | 51.48 | 62.29 | −16.34 |
| 0 | 100 | 100 | 20 | 45.74 | 72.16 | −15.76 |
| 0 | 100 | 100 | 40 | 89.08 | −6.35 | −14.72 |
| 0 | 100 | 100 | 60 | 84.33 | 1.54 | −16.19 |
| 0 | 100 | 100 | 80 | 79.77 | 8.58 | −17.48 |
| 100 | 100 | 100 | 100 | 75.21 | 15.46 | −18.6 |
| 0 | 0 | 0 | 0 | 70.63 | 22.38 | −19.51 |
| 0 | 0 | 20 | 0 | 63.54 | 33.51 | −20.42 |
| 0 | 0 | 40 | 0 | 56.07 | 45.78 | −20.75 |
| 0 | 0 | 60 | 0 | 48.78 | 58.09 | −20.57 |
| ... | ... | ... | ... | ... | ... | ... |

BEGIN_LUT CLUT 3 3

| RGB R=32 | RGB G=32 | RGB B=32 | Lab L | Lab a | Lab b |
|---|---|---|---|---|---|
| 0 | 0 | 0 | 0.348 | -127.113 | -127.113 |
| 0 | 0 | 3.226 | 0.784 | -127.086 | -120.802 |
| 0 | 0 | 6.452 | 1.009 | -127.004 | -116.016 |
| 0 | 0 | 9.677 | 1.184 | -126.829 | -111.393 |
| 0 | 0 | 12.903 | 1.407 | -126.568 | -106.109 |
| 0 | 0 | 16.129 | 1.688 | -126.257 | -100.105 |
| 0 | 0 | 19.355 | 2.02 | -125.911 | -93.626 |
| 0 | 0 | 22.581 | 2.397 | -125.521 | -86.856 |
| ... | ... | ... | ... | ... | ... |

FIG.7B

BEGIN_LUT CLUT 3 3

| Lab L=17 | Lab a=17 | Lab b=17 | RGB R | RGB G | RGB B |
|---|---|---|---|---|---|
| 0 | -128 | -128 | 0 | 28.925 | 95.75 |
| 0 | -128 | -112.063 | 0 | 30.542 | 82.341 |
| 0 | -128 | -96.125 | 0 | 30.665 | 66.909 |
| 0 | -128 | -80.188 | 0 | 29.125 | 52.03 |
| 0 | -128 | -64.25 | 0 | 27.457 | 39.298 |
| 0 | -128 | -48.313 | 0 | 26.496 | 28.798 |
| ... | ... | ... | ... | ... | ... |

IMAGE PROCESSING APPARATUS, IMAGE OUTPUT SYSTEM, IMAGE PROCESSING CONTROL METHOD AND COMPUTER READABLE INFORMATION RECORDING MEDIUM

BACKGROUND OF THE INVENTION

1. Field of the Invention

The present invention relates to an image processing apparatus, an image output system, an image processing control method and a computer readable information recording medium. In more detail, the present invention relates to an image processing apparatus, an image output system, an image processing control method and a computer readable information recording medium, by which even in a case where color reproduction elements such as an image output method of an image output apparatus, an output medium and/or the like are different, image processing is carried out in such a manner that an image can be output with the required color reproduction.

2. Description of the Related Art

As communication networks have been developed, printing systems such as a "Web to Print" system and so forth have appeared. In the "Web to Print" system, printing request apparatuses such as plural computers and a printing request receiving apparatus of a printing company are connected by a communication network such as the Internet. The printing request receiving apparatus includes plural image forming apparatuses (printer apparatuses, multifunction peripherals and/or the like) of plural image forming methods (offset printing method, electrophotographic printing method, inkjet printing method and/or the like). In this system, based on image data and printing apparatus designating information for designating the image forming apparatus that prints an image transmitted from the printing request apparatus via the communication network, the designated image forming apparatus prints an image on an output medium such as paper, a film or the like based on the transmitted image data.

In such a printing system, image forming apparatuses of various image forming methods are prepared, a user can designate an image forming apparatus for printing an image from printing data (image data) to transmit as an image forming apparatus that prints the image for the purpose of forming a desired image at a desired cost. However, the designated image forming apparatus may be in a printing unavailable state due to a failure or because it is currently printing a large amount of data. In such a case, the user should again select another image forming apparatus as an image forming apparatus to print an image, and cause it to print the image.

However, when the image forming apparatus that prints an image is thus changed, the color gamut may become different depending on the image forming method, thus the colors of the image obtained through printing may become different, and the desired image may not be obtained.

A color conversion apparatus has been proposed (see Japanese Laid-Open Patent Application No. 2002-252785 (Patent reference No. 1)). This color conversion apparatus converts input color data expressed by any color system into color data with which any color image output apparatus can reproduce the colors. The color conversion apparatus includes a color reproduction range A storage part that stores a color reproduction range A of the color image output apparatus and a color reproduction range B storage part that stores a virtual color reproduction range B that at least includes the color reproduction range A. The color conversion apparatus further includes a first color conversion part that carries out color compression of the input color data referring to the virtual color reproduction range B stored by the color reproduction range B storage part. The color conversion apparatus further includes a second color conversion part that carries out color compression of the color data that has undergone the color compression by the first conversion part referring to the color reproduction range A stored by the color reproduction range A storage part. The color conversion apparatus converts the input color data into color data with which the color output apparatus can reproduce the colors. This art attempts to reproduce colors with the same impression even using different output devices (i.e., image forming apparatuses to carry out printing such as printer apparatuses) for the purpose of carrying out uniform color reproduction using plural image forming apparatuses. For this purpose, a color gamut of a virtual device is defined. The color gamut of a virtual device encompasses color gamuts of plural image forming apparatuses, and also, has the shape closer to output devices than input color spaces such as sRGB, AdobeRGB and so forth (Adobe is a registered trademark). Then, in the thus defined color gamut, typical color data obtained from color compression of input color data is stored. Then, color compression is carried out from the typical color data into a color gamut of an output device so as to reproduce colors with the same impression even using the different output device. Thus, this art attempts to carry out uniform color reproduction even using plural image forming apparatuses.

Further, an image processing method has been proposed (see Japanese Laid-Open Patent Application No. 11-313216 (Patent reference No. 2)). In this method, color reproduction range information of a target output device is input. Color reproduction range information of plural output devices different from the target output device is input. Then, based on the color reproduction range information of the target output device and the color reproduction range information of the plural output devices, an output device is automatically selected from among the plural output device to be used for carrying out a proof of the target output device. This art compares the color gamut of the target output device with the color gamuts of the plural output devices different from the target output device. Then, in a case where an output device has been discovered which is different from the target output device and encompasses the color gamut of the target output device, the discovered output device is automatically selected as an output device for carrying out a proof of the target output device.

However, in the above-described related arts, it is attempted to carry out outputting of an image having impression of the same colors only considering an output device. Thus, consequently it may result in an output image having colors different from desired ones. That is, not only an output device but also an output medium affects colors of an output image. For example, the color gamut may become different depending on a color reproduction element such as whether an output medium is paper or a film; whether the type of paper is coated paper, non-coated paper, glossy paper or the like; whether the thickness of paper is cardboard, plain paper, thin paper or the like; and whether an output medium is a display device, a projector or the like instead of paper or a film. That is, the color gamut of an output image may become different or be in the same range not only due to a difference in an output device but also due to a difference of a color reproduction element such as an output medium. As a result, even when a virtual color gamut or typical colors is/are determined for each image forming method as in the related arts, it may be difficult to make the impression of colors identical at a time of outputting because of a difference in an output medium. Further, in a case of defining a virtual color gamut to encompass the color gamuts of plural output devices, it may be necessary to increase the highest chromaticness of a virtual color gamut for a certain hue, or increase the reproducible lightness range. As a result, the divergence between the actual color gamut of an output device and the virtual color gamut may be increased, and the uniformity of colors among output devices may be lost.

Further, there may a case where printing colors of a target output device are simulated using another output device, or it becomes necessary to use another output device for printing because a target output device has a failure. In such a case, the other output device may not completely encompass the color gamut of the target output device. In such a case, it may not be possible to know how much difference in colors will occur at a time of actually outputting image data, even when a numerical value is shown which indicates the magnitude of the common color gamut part between the target output device and the other output device or the magnitude of the part of the color gamut which is not encompassed by the other output device. Thus, it may be difficult to determine whether it is possible to place an order or give an instruction to continue the printing.

SUMMARY OF THE INVENTION

In an embodiment, an image processing apparatus includes a communication part connected with an image output request apparatus and plural image output apparatuses and carries out communication therewith. The image processing apparatus further includes a profile storage part that stores, as profile information, color gamuts of output images determined by at least image output methods of the plural image output apparatuses and output media. The image processing apparatus further includes a color reference storage part that stores plural sets of color reference data for associating a color gamut of image data given by the image output request apparatus and a color gamut of an output image that is output by one of the image output apparatuses which outputs the image data. The image processing apparatus further includes an image output possibility determination part that determines whether it is possible to output the image data received from the image output request apparatus by the one of the image output apparatus. The image processing apparatus further includes an output apparatus determination part that determines, based on an instruction given by the image output request apparatus, the one of the image output apparatuses for outputting the image data that the communication part has received from the image output request apparatus. Then, when the image output possibility determination part has determined that outputting by the one of the image output apparatuses is not possible, the output apparatus determination part determines another one of the image output apparatuses as one that outputs the image data. The image processing apparatus further includes a data generation part that generates, from the image data, a preview image for an image output result of the determined one of the image output apparatuses and image data for outputting to be used to output the image data by the determined one of the image output apparatuses, based on the image data given by the image output request apparatus, the profile information of the determined one of the image output apparatuses for outputting the image data and the color reference data. The image processing apparatus further includes a transmission control part that controls a transmission of the preview image generated by the data generation part to the image output request apparatus using the communication part and a transmission of the image data for outputting generated by the data generation part to the determined one of the image output apparatuses, using the communication part.

Other objects, features and advantages of the present invention will become more apparent from the following detailed description when read in conjunction with the accompanying drawings.

BRIEF DESCRIPTION OF THE DRAWINGS

FIGS. 4A, 4B and 4C show one example of reference gamuts and actual output device gamut classifications;

FIGS. 5A and 5B show one example of output device gamuts and virtual color gamut;

FIGS. 7A and 7B show one example of a color reference;

DETAILED DESCRIPTION OF THE EMBODIMENTS

Below, preferable embodiments will be described in detail based on accompanying drawings. It is noted that the embodiments that will be described now are preferable embodiments, and thus various limitations that are technically preferable are included. However, the present invention is not limited to these embodiments, and not all features described for the embodiments are indispensable for the present invention.

First Embodiment

Figure 1:
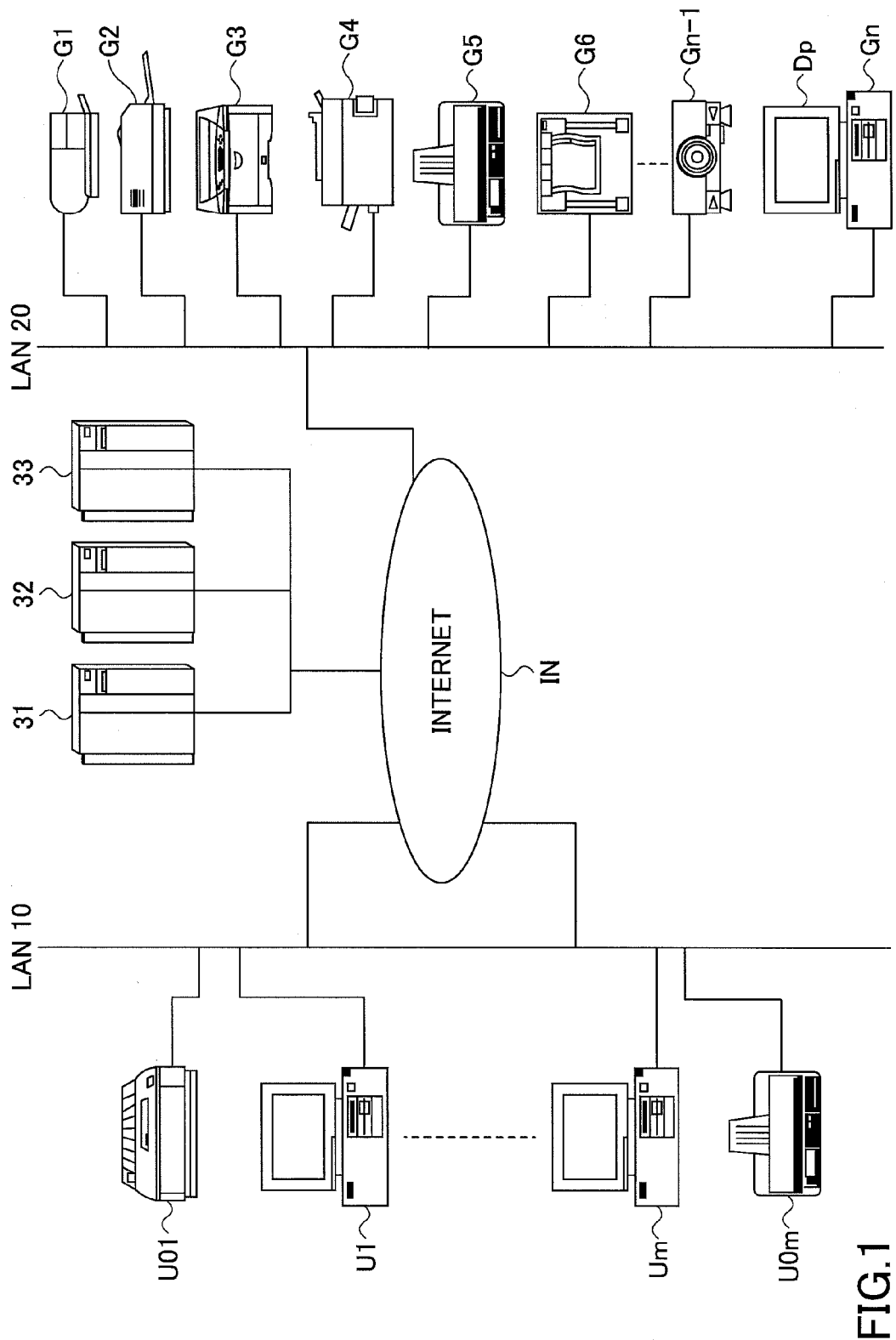
FIG. 1 shows a system diagram of a printing system to which a first embodiment is applied.

FIGS. 1 to 11 show an image processing apparatus, an image output system, an image processing control method and a computer readable information recording medium according to a first embodiment. FIG. 1 shows a system configuration of a printing system 1 to which the image processing apparatus, image output system, image processing control method and computer readable information recording medium according to the first embodiment are applied.

In FIG. 1, in the printing system (image output system) 1, a local area network (LAN) 10 on a user side and a LAN 20 on a printing company side are connected via the Internet IN. Further, to the Internet IN, a web server 31, an image processing server 32 and a fault detection server 33 are connected. All of the web server 31, image processing server 32 and fault detection server 33 act as an image processing apparatus.

To the LAN 10 on the user side, plural user terminals U1 to Um such as personal computers and plural user output apparatuses UO1 to UOm are connected. The LAN 10 on the user side is connected to the Internet IN via an access point or the like (not shown).

As the user terminals (image output request apparatus(es)) U1 to Um, personal computers or the like having usual hardware configurations and software configurations are used. In particular, in the user terminals U1 to Um, various sorts of application software, in particular, for creating image data to be used as printing original images or the like, web browsers to be used for carrying out image output requests such as printing orders for the thus-created image data via the Internet IN and the like are mounted. The user terminals U1 to Um transmit the printing orders for the image data created using these sorts of software to the LAN 20 on the printing company side via the Internet IN.

The user output apparatuses UO1 to UOm are image forming apparatuses such as printer apparatuses, multifunction peripherals or the like, and are used for carrying out test printing or the like for the purpose that the users confirm the colors and/or layouts to be obtained when the image data as printing original images are printed, before actually placing the printing orders for the image data created by the users.

To the LAN 20 on the printing company side, plural company image output apparatuses (image output apparatuses) G1 to Gn (i.e., G1, G2, G3, G4, G5, G6, . . . , Gn−2, Gn−1 and Gn) using plural output methods, respectively, are connected, and the LAN 20 on the printing company side is connected to the Internet IN via an access point or the like (not shown).

The company image output apparatuses G1 to Gn−2 (i.e., G1, G2, G3, G4, G5, G6, . . . and Gn−2) are image forming apparatuses that carry out image output operations of various output methods such as an offset printing method, an electrophotographic printing method, an ink-jet printing method and/or the like, and carry out image forming output operations (printing output) on various sorts and various thicknesses of paper, polyethylene films or the like, for example.

The company image output apparatus Gn−1 is a projector, and carries out a projecting output of image data of a received order.

The company image output apparatus Gn is a computer terminal, and is used to confirm colors and/or a layout(s) obtained when web content, an electronic book or the like has been created from given image data as a printing original image(s) by carrying out a displaying output on a display device Dp.

As the web server 31, a usual computer or server is used. The web server 31 provides a user interface (UI) to the user terminals U1 to Um for the users to place printing orders using the web browsers. Also, the web server 31 receives image data, output device designation information for designating any of the company image output apparatuses G1 to Gn for outputting the image data, output media (such as paper, paper types, films and/or the like) and/or the like, sent from the user terminals U1 to Um, and transmits them to the image processing server 32.

As the image processing server 32, a usual computer or server is used. The image processing server 32 carries out processing such as generating preview images to be submitted to the users based on the image data and/or the output device designation information sent from the user terminals U1 to Um via the web server 31, also, converting the received image data into image data suitable for the company image output apparatuses G1 to Gn that output images, transmitting the converted image data to the company image output apparatuses G1 to Gn that output images, via the web server 31, and/or the like.

The fault detection server (image output possibility determination part) 33 monitors the company image output apparatuses G1 to Gn to determine whether they are operating normally. In a case where a problem has occurred, the fault detection server 33 transmits information of one of the company image output apparatuses G1 to Gn which outputs an image, in particular, information concerning whether there is a fault, to the web server 31 and/or the image processing server 32, in response to a fault detection request or the like from the web sever 31.

Figure 2:
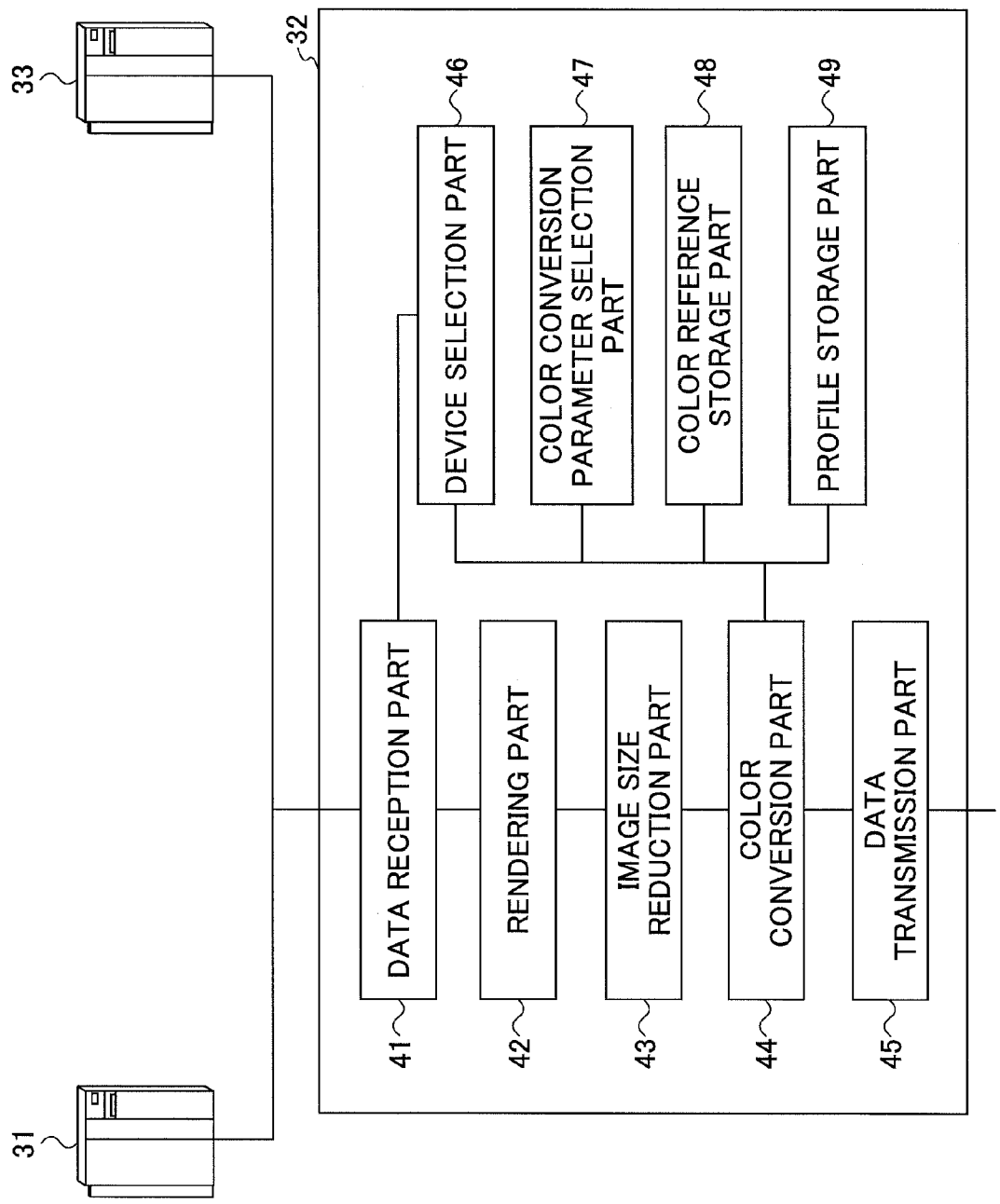
FIG. 2 shows a block configuration of an image processing server.

As shown in FIG. 2, the image processing server 32 includes a data reception part 41, a rendering part 42, an image size reduction part 43, a color conversion part 44, a data transmission part 45, a device selection part 46, a color conversion parameter selection part 47, a color reference storage part 48 and a profile storage part 49. The image processing server 32 is connected with the web server 31 and the fault detection server 33, and also, is connected with the Internet IN.

The data reception part 41 includes a network interface card (NIC) or the like, and receives image data created by a user, user's instructional information (output device designation information or the like), a request and/or the like via the web server 31. Further, the data reception part 41 receives information of one of the company image output apparatuses G1 to Gn which outputs an image, in particular, information concerning whether there is a fault from the fault detection server 33.

The rendering part 42 develops a part of image data described by page description language (PDL) into raster data, and outputs the raster data to the image size reduction part 43.

The image size reduction part 43 reduces the size of an image by carrying out the thinning out of pixels in a case where a preview image to be submitted to a user is generated from image data.

The color conversion part 44 is connected with the image size reduction part 43 and the data transmission part 45, and also, is connected with the device selection part 46, the color conversion parameter selection part 47, the color reference storage part 48 and the profile storage part 49. The color conversion part 44 carries out color conversion of input image data by carrying out interpolation of a predetermined conversion table such as an international color consortium (ICC) profile according to a standard provided by the ICC.

The data transmission part 45 includes, generally, a NIC or the like. In a case where image data obtained from data conversion is a preview image, the data transmission part 45 transmits the preview image to a corresponding one of the user terminals U1 to Um of a user via the web server 31. In a case where image data obtained from data conversion is an image to be printed, the data transmission part 45 transmits the image to one of the company image output apparatuses G1 to Gn determined according to a user's request. Further, the data transmission part 45 transmits a request for obtaining state information of one of the company image output apparatuses G1 to Gn requested by a user, to the fault detection server 33.

The device selection part (output device determination part) 46 determines one of the company image output apparatuses G1 to Gn for outputting image data received from one of the user terminals U1 to Um based on output device designation information (instruction(s)) from the one of the user terminals U1 to Um. Further, in a case where the fault detection server 33 has determined that it is not possible to output the an image by the determined one of the company image output apparatuses G1 to Gn, the device selection part 46 refers to the profile information of the profile storage part 49 described later, determines another one of the company image output apparatuses G1 to Gn, different from the one of the company image output apparatuses G1 to Gn determined as not possible to output an image, as one of the company image output apparatuses G1 to Gn for outputting an image, and outputs information of the thus determined one (device) of the company image output apparatuses G1 to Gn to the color conversion parameter selection part 47.

The color conversion parameter selection part 47 selects a color reference to be used for color conversion from the color reference storage part 48 and a color reference profile to be used for color conversion from the profile storage part 49 based on the information of the determined one of the company image output apparatuses G1 to Gn received from the device selection part 46.

The color reference storage part 48 stores a table in which a color reference such as the above-mentioned ICC profile is described. The profile storage part 49 stores profiles for converting between device color spaces of the company image output apparatuses G1 to Gn and profile connection spaces (PCS (L*a*b*)).

All of the rendering part 42, image size reduction part 43, color conversion part 44 and color conversion parameter selection part 47 act as a data generation part. All of the web server 31, data reception part 41 and data transmission part 45 act as a communication part and a transmission control part.

Figure 3:
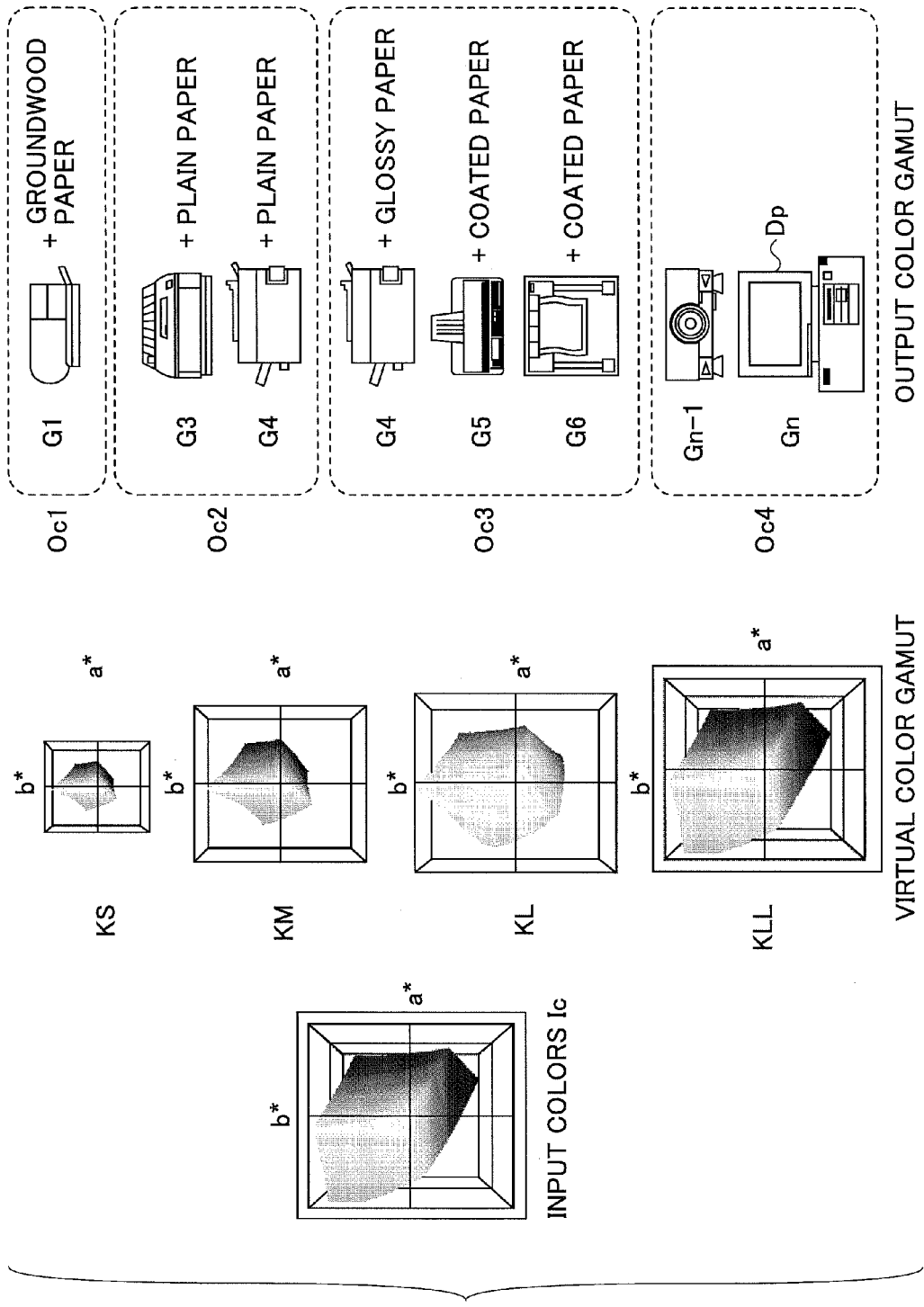
FIG. 3 shows a relationship among input colors, virtual color gamuts and output color gamuts for outputting an image.

According to the printing system 1, for example, as shown in FIG. 3, "virtual color gamuts": "KS", "KM", "KL" and "KLL" are previously prepared corresponding to "output color gamuts": "Oc1", "Oc2", "Oc3" and "Oc4", respectively, for a case where "input colors" Ic are to be output using any one of combinations of various sorts of color reproduction elements for outputting using any one of various types of output media, for example, any one the output color gamuts Oc1, Oc2, Oc3 and Oc4, using any one of the company image output apparatuses G1 to Gn. Thus, it is possible to carry out an image output of similar colors even when one of the output color gamuts Oc1, Oc2, Oc3 and Oc4 to be used is different thereamong.

That is, in FIG. 3, the view of "input colors Ic" is a view of the color gamut (for example, sRGB or AdobeRGB) of image data, created by a user using a corresponding one of the user terminals U1 to Um, viewed from the L* axis direction of a uniform color space CIELAB space. In FIG. 3, "virtual color gamuts": "KS", "KM", "KL" and "KLL" show plural color gamuts including large and small color gamuts according to the image forming methods of the company image output apparatuses G1 to Gn and types of output media such as paper, a film and so forth. In FIG. 3, for example, it can be seen that the difference between the color gamuts is relatively large depending on whether plain paper or glossy paper is used in the company image output apparatus G4, and thus, the corresponding "virtual color gamuts" "KM" and "KL" are different accordingly. In FIG. 3, the "virtual color gamut" "KLL" is the color gamut assuming web content displayed by a liquid crystal display device, an image projector or the like, instead of a printing output onto paper or the like by toner or ink, and thus, is equal to the color gamut of the input colors Ic.

FIGS. 4A, 4B and 4C show classifications of basic gamuts and the actual gamuts of the company image output apparatuses G1 to Gn (hereinafter, simply referred to as "output device gamuts"). In FIG. 4A, "Gm1" shows L*a*b* values of solid states of primary colors (C: cyan, M: magenta, Y: yellow) and secondary colors (R: red, G: green, B: blue) of a basic gamut Gm1. In FIG. 4A, "Gm2" shows L*a*b* values of solid states of primary colors (C: cyan, M: magenta, Y: yellow) and secondary colors (R: red, G: green, B: blue) of a basic gamut Gm2. As the basic gamuts Gm1 and Gm2, colorimetric values may be used which are obtained when the image forming methods of the company image output apparatuses G1 to Gn and typical output media are combined. Specific examples of the combination include the above-mentioned output color gamut Oc1 obtained from combining the company image output apparatus G1 and groundwood paper; the above-mentioned output color gamut Oc2 obtained from combining the company image output apparatus G4 and plain paper; the above-mentioned output color gamut Oc3 obtained from combining the company image output apparatus G5 and glossy paper; and the above-mentioned output color gamut Oc4 obtained from combining the company image output apparatus Gn of FIG. 3. Alternatively, typical gamuts in digital printing for which standardization is being studied in the International Organization for Standardization (ISO) 15339, TC130 may be used.

FIGS. 4B and 4C, "Om1", "Om2", "Om3", "Om4", "Om5" and "Om6" are output device gamuts that are L*a*b* values of primary colors and secondary colors of the actual company image output apparatuses G1 to Gn. The classifications of these output device gamuts Om1, Om2, Om3, Om4, Om5 and Om6 are made as follows. That is, the color differences are calculated between the primary colors and secondary colors thereof and the basic gamuts Gm1 and Gm2. Then, each one of the output device gamuts is classified into any one of the basic gamuts Gm1 and Gm2 with which the average color difference falls within a predetermined value (for example, ΔEab=5) or becomes minimum. In the example of FIGS. 4A, 4B and 4C, the output device gamuts Om1, Om2 and Om3 are classified into the basic gamut Gm1; and the output device gamuts Om4, Om5 and Om6 are classified into the basic gamut Gm2.

FIGS. 5A and 5B illustrates a definition of the virtual color gamut. In FIG. 5A, "Oma", "Omb" and "Omc" are data of the output device gamuts Oma, Omb and Omc of those of the company image output apparatuses G1 to Gn classified into the same group. These output device gamuts Oma, Omb and Omc are the L*a*b* values of the respective colors in a case where an output is carried out using combinations of CMYK color materials (combinations of RGB signals, in a case where the corresponding one of the company image output apparatuses G1 to Gn is the display device Dp of the company image output apparatus Gn or the like) corresponding to the outermost of the color gamuts.

In FIG. 5B, "Kx" is data of the virtual color gamut Kx, and is data obtained from averaging the L*a*b* values of "Oma", "Omb" and "Omc" of FIG. 5A at the same CMYK, respectively.

Thus, for example, the virtual color gamut Kx is created from averaging the output device gamuts Oma, Omb and Omc of the company image output apparatuses G1 to Gn classified into the same group as shown in FIG. 5A. For example, in the case of FIG. 3, the plural virtual color gamuts KS, KM, KL and KLL having the large and small sizes are created from averaging the output device gamuts of the company image output apparatuses G1 to Gn of the output color gamuts Oc1, Oc2, Oc3 and Oc4.

Figure 6:
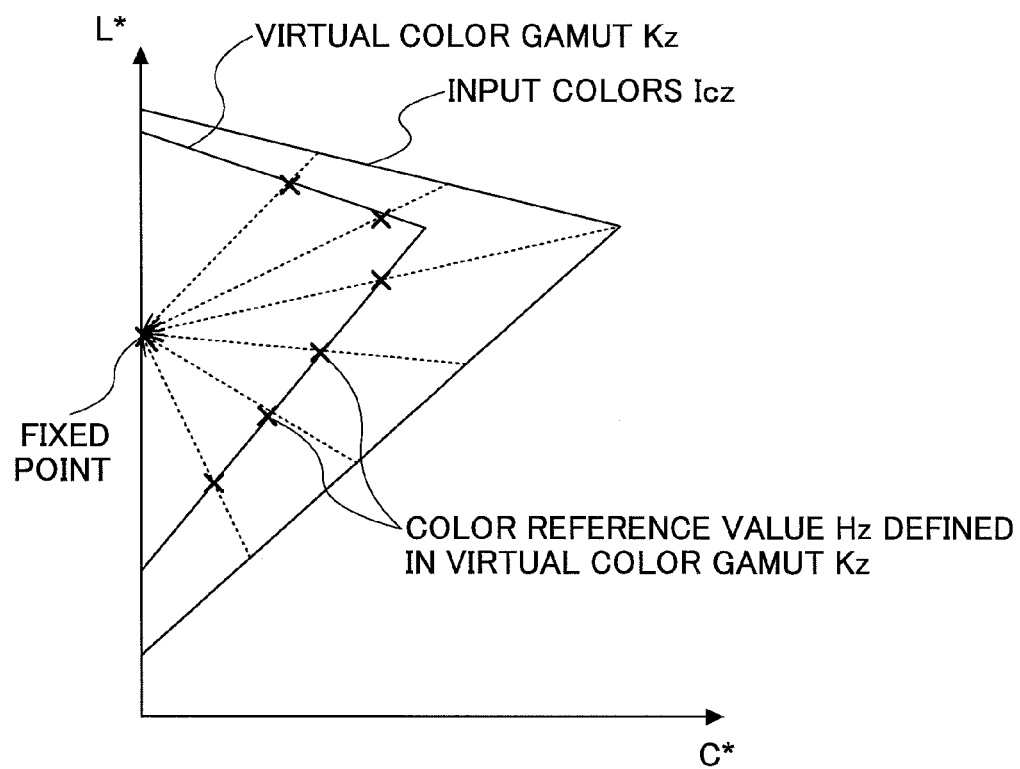
FIG. 6 illustrates a definition of a color reference.

After the input colors and the virtual color gamuts are thus determined as described above, color references will be set as shown in FIG. 6.

That is, FIG. 6 shows processing of, in a L*a*b* uniform color space (it is noted that "C*" in FIG. 6 indicates chroma calculated from a*b*c* values), mapping the input colors Icz inside the virtual color gamut Kz and setting color reference values Hz inside the virtual color gamut Kz.

In FIG. 6, first, lattice point data (data such as that shown below obtained when RGB values are divided at regular intervals) of the input colors (sRGB or AdobeRGB) is converted into L*a*b* values according to the definition of sRGB or AdobeRGB.

(R, G, B)=(0, 0, 0), (0, 0, 16), (0, 0, 32), . . . .

Then, it is determined using the L*a*b* value of the input color Icz and data of the virtual color gamut whether the input color Icz is not inside the virtual color gamut Kz. When the input color Icz is not inside the virtual color gamut Kz, the intersection ("color reference defined in virtual color gamut Kz") between the straight line extending from the input color Icz toward a fixed point ("fixed point") on the lightness L* axis and the virtual color gamut Kz is calculated, for example, as shown in FIG. 6. The thus calculated intersection is defined as the color reference Hz to be defined in the virtual color gamut Kz. A specific calculation method to be used for this defining the color reference Hz may be a known method, and it is also possible to map the lattice point of the input color Icz inside the virtual color gamut Kz by using a method other than the above-mentioned method.

Then, it is possible to create correspondence tables of the color reference values such as those shown in FIGS. 7A and 7B by associating the thus mapped RGB values of the input colors Icz with the L*a*b* values inside the virtual color gamut Kz. FIG. 7A is for sRGB→L*a*b*, and FIG. 7B is for L*a*b*→sRGB. The image processing server 32 stores these correspondence tables as color references in the color reference storage part 48. The color references are previously prepared, the number of which is the number obtained from multiplying the number of types of the input colors (sRGB, AdobeRGB, . . . ), i.e., the number of typical color spaces used by the users for creating the printing original images (image output originals) using the user terminals U1 to Um with the number of the virtual color gamuts, and the color references are stored in the color reference storage part 48. The color references may be written, for example, using a definition file called an ICC profile in conformity to the standard provided by the ICC. That is, based on the specification for the ICC profile, it is possible to describe the color reference in a standard file format by describing the above-mentioned correspondence table between the input colors Icz and the color reference values Hz defined in the virtual color gamut Kz in an A2B tag (in which a conversion equation or a table from a device color space to a PCS (L*a*b*) is described), and also, describing a table of associating lattice data obtained from equally dividing the L*a*b* space with RGB values obtained from a reverse conversion according to the definitional identity of sRGB or AdobeRGB (input colors) in a B2A tag (from a PCS to a device color space).

The color reference storage part 48 stores these color references. The profile storage part 49 stores the profile for conversion between the device color spaces of the company image output apparatuses G1 to Gn and the PCS, for example, in the form of the ICC profile.

In the printing system 1 according to the first embodiment, the web server 31, the image processing server 32 and the fault detection server 33 read image processing control programs from computer readable information recording media, and introduces the image processing control programs for carrying out an image processing control method in ROMs or hard disks. Specific examples of the computer readable information recording medium include a ROM, an electrically erasable and programmable read-only memory (EEPROM), an EPROM, a flash memory, a flexible disk, a compact disc read-only memory (CD-ROM), a compact disk rewritable (CD-RW), a digital versatile disk (DVD), a secure digital (SD) card, a magneto-optical disc (MO) and so forth. By thus introducing the image processing control programs, the web server 31, the image processing server 32 and the fault detection server 33 are built as the image processing apparatus that carries out the image processing control method of carrying out image processing such that the uniformity of colors is ensured even when images are output by output apparatuses having different image reproduction elements such as different image output methods of the output apparatuses, output media and/or the like. The image processing control programs is computer executable programs, described in a legacy programming language such as assembler, C, C++, C#, Java (registered trademark) or the like, an object-oriented programming language, or the like, and can be distributed after being stored in the above-mentioned computer readable information recording medium.

Next, the functions of the first embodiment will be described. A case will be assumed where image data is created by a user using one of the user terminals U1 to Um and an image is output, i.e., for example, is printed, from the created image data using one of the company image output apparatuses G1 to Gn, which one is designated by the user. Further in this case, the designated one of the company image output apparatuses G1 to Gn cannot be used due to a failure or the like, and thus, another one of the company image output apparatuses G1 to Gn is to be used for outputting the image. In this case, in the printing system 1 according to the first embodiment, image adjustment is carried out such that the image can be output in a state of uniformity in colors being ensured between the first designated one of the company image output apparatuses G1 to Gn and the other one designated afterward because the first one cannot be used due to the failure or the like.

That is, in the printing system 1, a user who is a print ordering person uses image data created using one of the user terminals U1 to Um of the LAN 10 of the user side or prepared in another method, and makes a printing request by designating one of the company image output apparatuses G1 to Gm of the LAN 20 of the printing company side connected via the Internet IN. In this case, the user uses the web browser of the one of the user terminals U1 to Um, accesses the web server 31 by inputting a uniform resource identifier (URI) of the web server 31 which provides a "Web to Print" service, for example, by selecting the web server 31 from bookmarks of the web browser using a keyboard or a mouse. The one of the user terminals U1 to Um thus accesses the web server 31, and then, requests a transmission of hyper text markup language (HTTP) data for the "Web to Print" service.

In response to the request from the one of the user terminals U1 to Um for HTML data, the web server 31 transmits, to the one of the user terminals U1 to Um, the HTML data for providing a UI for the "Web to Print" service and other data that is referred in the HTML data (image data for building the UI and/or the like).

After receiving the HTML data from the web server 31, the one of the user terminals U1 to Um interprets the HTML, and displays a screen page of the "Web to Print" service on a display device.

Then, the user uses the UI of the "Web to Print" service displayed on the display device of the one of the user terminals U1 to Um, designates the image data from which an image is to be output, i.e., for example, to be printed, determines the output device designation information in consideration of the intended purpose (for a leaflet, a catalog or the like) and/or the output (printing) cost, and transmits a job including the image data and the output device designation information to the web server 31. The output device designation information includes information identifying one of the company image output apparatuses G1 to Gn and information identifying the type of the output medium such as paper, a film or the like.

After receiving the job including the image data and the output device designation information from the one of the user terminals U1 to Um, the web server 32 transmits the job to the image processing server 32.

After the data reception part 41 of the image processing server 32 receives the job including the image data and the output device designation information (step S101 of FIG. 8), the image processing server 32 generates a preview image and an image data for outputting based on the image data and the output device designation information in step S102. The image processing server 32 transmits the preview image data to the web server 31 and transmits the image data for outputting to the one of the company image output apparatuses G1 to Gn designated by the user via the web server 31.

After receiving the preview image data from the image processing server 32, the web server 31 inquires of the fault detection server 33 whether the one of the company image output apparatuses G1 to Gn designated by the output device designation information has a fault to prevent printing due to a failure or the like, and waits for a detection result from the fault detection server 33 (step S103). When the designated one of the company image output apparatuses G1 to Gn has a fault in step S103 (YES), the web server 31 stores the preview image data in an internal memory, and shows a list of the company image output apparatuses G1 to Gn other than the designated one for the user to select an alternative one ("alternative printer" in FIG. 8) therefrom to the one of the user terminals U1 to Um which has sent the job. Alternatively, the web server 31 may set information indicating that "any one of the company image output apparatuses G1 to Gn will be used" instead of actually determine an alternative one at this stage (step S104). It is noted that specific examples of the above-mentioned "fault" of the designated one of the company image output apparatuses G1 to Gn may include not only a fault of the company image output apparatus such that it cannot operate correctly but also some state that prevents the company image output apparatus from printing the image data included in the job the data reception part 41 has received in step S101, for example, an offline state, an out-of-toner state and so forth.

The web server 31 sends to the image processing server 32 the preview image stored in the internal memory and the information of the alternative one of the previously designated one of the company image output apparatuses G1 to Gn (a fictitious IP address or the like in the case where the information indicating that "any one of the company image output apparatuses G1 to Gn will be used" has been set). The image processing server 32 again generates a preview image, and also, again generates image data for outputting in step S105. Then, in the same manner as above, the image processing server 32 transmits the preview image data to the web server 31 and transmits the image data for outputting to the newly selected one of the company image output apparatuses G1 to Gn. It is noted that details of generating the preview image data and the image data for outputting will be described later in detail using FIG. 9.

The web server 31 transmits the preview images of a state of arranging the preview image by the previously designated one of the company image output apparatuses G1 to Gn and the preview image by the one of the company image output apparatuses G1 to Gn selected as the alternative one side by side, and causes the one of the user terminals U1 to Um to display the preview images of the above-mentioned state. Then, the user can determine whether the printing is permissible. The web server 31 then determines whether the user's determination result transmitted from the one of the user terminals US to Um indicates to permit the printing (step S106).

When the printing is not permitted (step S106 NO), the web server 31 determines whether the number of times of the user's determinations of not permitting the printing is within a predetermined number N (for example, five times) (step S107). When the number of times is less than or equal to N (step S107 YES), the process is returned to step S104. Then, the operations starting from selecting an alternative one of the previously designated/selected one(s) of the company image output apparatuses G1 to Gn are carried out in the same way (steps S104 to S107).

When no fault exists in the one of the company image output apparatuses G1 to Gn first designated by the user (step S103 NO), the web server 31 transmits the preview image to the one of the user terminals U1 to Um which has sent the job and causes it to display the preview image by the web browser. Also, the web server 31 transmits a message to ask the user whether the user permits the start of the printing. Next, the process proceeds to step S106, and it is determined whether the printing is permissible. When the printing is not permitted by the user (step S106 NO), the web server 31 determines whether the number of times of the user's determinations of not permitting the printing is within the predetermined number N in the same manner as above (step S107). When the number of times is less than or equal to N (step S107 YES), the process is returned to step S104. Then, the operations starting from selecting an alternative one of the previously designated/selected one(s) of the company image output apparatuses G1 to Gn are carried out in the same manner as above (steps S104 to S107).

Figure 8:
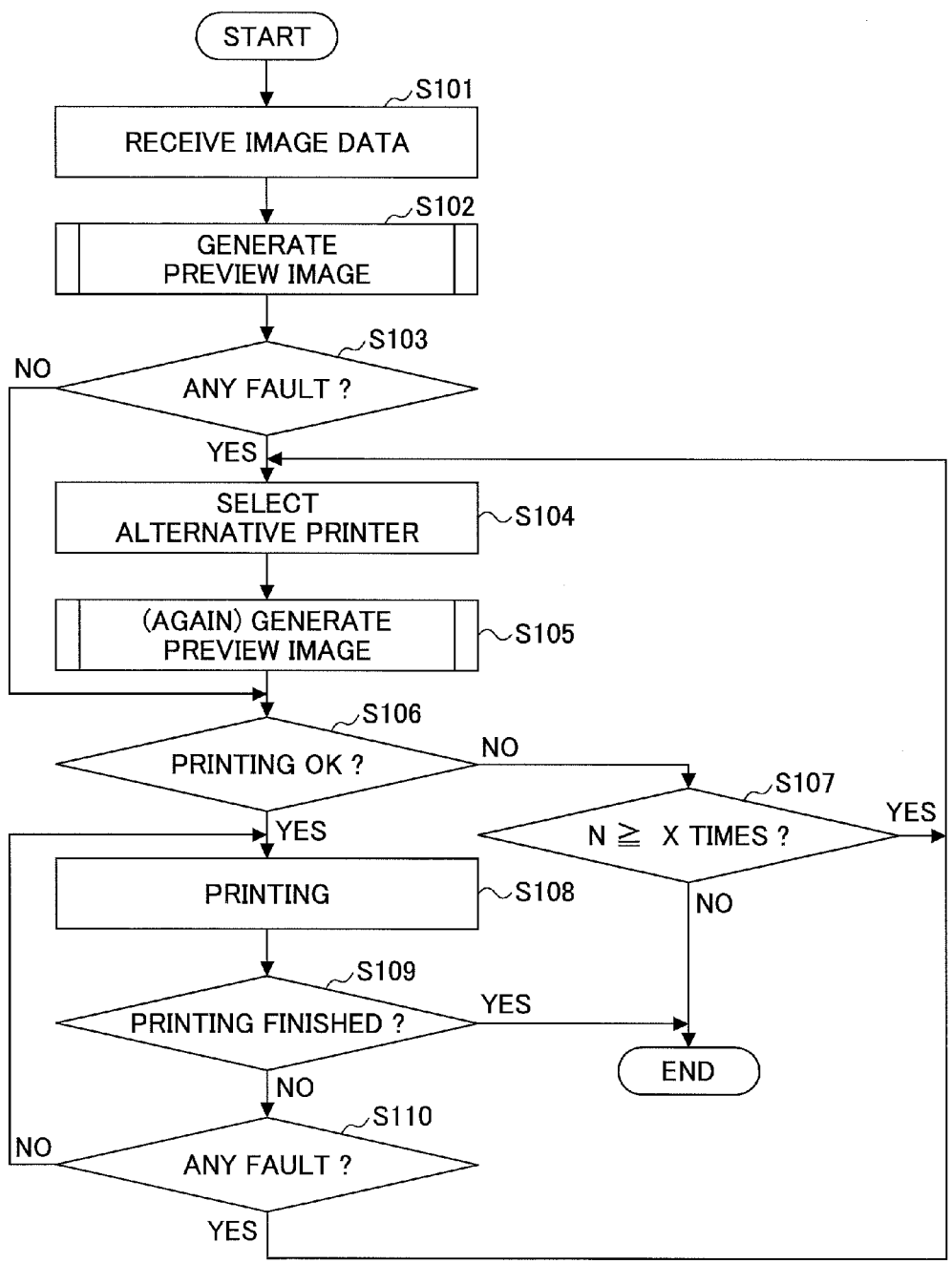
FIG. 8 is a flowchart showing a printing control process.

When the number of times exceeds the predetermined number N (step S107 NO), the web server 31 determines that there are none of the company image output apparatuses G1 to Gn which satisfy the user's required quality, notifies the one of the user terminals U1 to Um which has sent the job of this matter, and finishes the printing processing control process of FIG. 8.

When the user determines that the printing is permissible (step S106 YES), the web server 31 transmits the image data for outputting to the currently designated/selected one of the company image output apparatuses G1 to Gn, and also transmits an instruction to start printing to the same company image output apparatus. Thus, the currently designated/selected one of the company image output apparatuses G1 to Gn is caused to carry out the printing based on the image data for outputting (step S108).

When the web server 31 thus causes the one of the company image output apparatuses G1 to Gn to start printing, the web server 31 inquires of the fault detection server 33 the operation state of the one of the company image output apparatuses G1 to Gn at predetermined intervals. Thus, the fault detection server 33 detects the state of the one of the company image output apparatuses G1 to Gn, and notifies the web server 31 thereof. Based on the notification from the fault detection server 33, the web server 31 determines whether the printing has been finished (step S109) and whether a fault has occurred (step S110). When the printing has not been finished (step S109 NO) and also a fault has not occurred (step S110 NO), the process is returned to step S108, and the printing is continued (steps S108 to S110).

When the printing has not finished (step S109 NO) and also a fault has occurred (step S110 YES), the web server 31 gives an instruction to stop the printing to the one of the company image output apparatuses G1 to Gn which is carrying out the printing. Further, the process is returned to step S104, the operations starting from selecting an alternative one of the previously designated/selected one(s) of the company image output apparatuses G1 to Gn are carried out in the same way (steps S104 to S110).

When the printing has finished without occurrence of a fault (step S109 YES), the web server 31 determines that the printing has been finished normally, and finishes the printing control process of FIG. 8.

Figure 9:
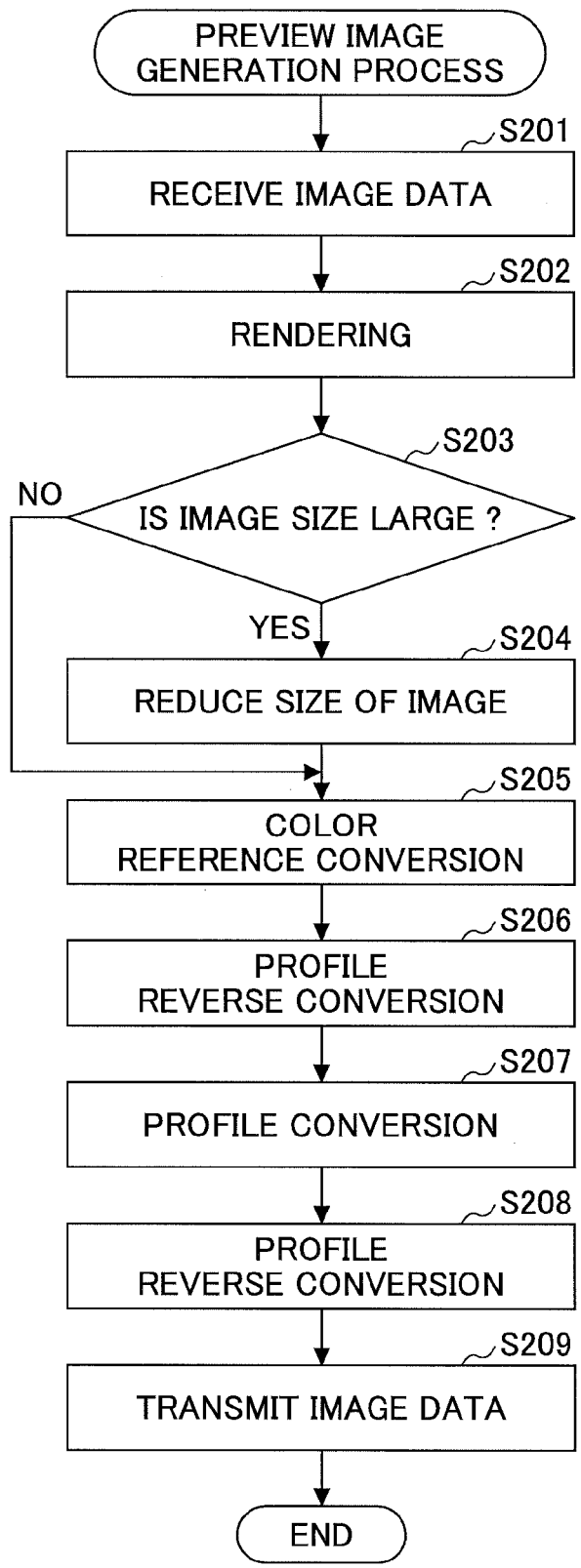
FIG. 9 is a flowchart showing a preview image generation process.

The image processing server 32 carries out the above-mentioned process of generating the preview image and again generating the preview image as shown in FIG. 9.

That is, after the data reception part 41 of the image processing server 32 receives the job from the web server 31 in step S101 of FIG. 8 (step S201), the data reception part 41 sends the image data to the rendering part 42, and sends the output device designation information to the device selection part 46.

The rendering part 42 develops the part described in PDL of the received image data in an internal memory, thus converts the image data into raster data, and sends the raster data to the image size reduction part 43 (step S202).

The device selection part 46 selects the set of output device information for which the combination of the one of the company image output apparatuses G1 to Gn which outputs an image and the paper type is coincident with that of the designated information of one of the company image output apparatuses G1 to Gn (i.e., the output device designation information) from among the previously stored sets of output device information of the company image output apparatuses G1 to Gn. Then, the device selection part 46 sends information identifying the color reference and the profile corresponding to the thus selected combination to the color conversion parameter selection part 47. Also, in a case where re-selection has not been made and the selected one of the company image output apparatuses G1 to Gn has been selected for the first time, the device selection part 46 gives a flag indicating that the selection is the first selection to the selected combination, and also, gives a flag indicating that it has already been selected, and stores the information of the flags in an internal memory.

In a case where the current selection of the one of the company image output apparatuses G1 to Gn is the one concerning re-selection (different from the one first selected by the user), the device selection part 46 selects the set of output device information of one of the company image output apparatuses G1 to Gn for which the combination of the one of the company image output apparatuses G1 to Gn which outputs an image and the paper type is coincident with the information of the designated one of the company image output apparatuses G1 to Gn (output device designation information). However, as to the color reference, information identifying the color reference of the combination to which the flag indicating that the selection is the first selection (corresponding to the one of the company image output apparatuses G1 to Gn first selected by the user) has been given is sent to the color conversion parameter selection part 47. As to the profile, information identifying the profile of the re-selected one of the company image output apparatuses G1 to Gn (different from the one first selected by the user) is sent to the color conversion parameter selection part 47. Further, the flag indicating that it has already been selected is given to the information of the combination of the one of the company image output apparatuses G1 to Gn and the paper type, and the information of the flag is stored in the internal memory.

In the case where the information designating the one of the company image output apparatuses G1 to Gn (output device designation information) indicates "any one of the company image output apparatuses G1 to Gn will be used", selection is made in the order such that the combination of the one of the company image output apparatuses G1 to Gn and the paper type for which the flag indicating that it has already been selected is not given and where the color reference values are smaller is selected earlier.

Based on the information identifying the color reference and the profile received from the device selection part 46, the color conversion parameter selection part 47 reads the corresponding color reference from the color reference storage part 48, gives it to the color conversion part 44, reads the corresponding profile from the profile storage part 49 and gives it to the color conversion part 44.

Then, the image size reduction part 43 determines whether any one of the vertical and horizontal sizes of the raster image data received from the rendering part 42 exceeds a predetermined value (for example, 500 pixels) (step S203). When the image size exceeds the predetermined value (step S203 YES), a thinning out process is carried out, the image size is reduced so that it becomes less than or equal to the predetermined value, and the raster image data is given to the color conversion part 44 (step S204). The image size reduction part 43 gives the raster image data as it is to the color conversion part 44 when each of both sizes of the raster image data received from the rendering part 42 is less than or equal to the predetermined value.

After receiving the image data from the image size reduction part 43, the color conversion part 44 carries out color conversion of the image data using the color reference and the profile of the one of the company image output apparatuses G1 to Gn received from the color conversion parameter selection part 47. In this color conversion, the color conversion part 44 first refers to the table of the color reference for converting RGB data into PCS data, carries out interpolation calculation, and converts all the pixels of the image data into PCS data. Thus, the input image data is converted into image data that is inside the virtual color gamut (step S205). Next, the color conversion part 44 refers to the table of the profile of the one of the company image output apparatuses G1 to Gn for converting a PCS into a device color space (for example, a CMYK color space), carries out interpolation calculation in the same way, and thus carries out a "profile reverse conversion" process to convert into image data for the one of the company image output apparatuses G1 to Gn. It is noted that in a case of generating the image data for outputting, the color conversion part 44 does not carry out the determination of the image size (step S203) and the image size reduction (step S204), generates the image data for outputting, and transmits the generated image data to the one of the company image output apparatuses G1 to Gn.

Next, the color conversion part 44 refers to the table of the profile of the one of the company image output apparatuses G1 to Gn for converting a device color space into a PCS, and carries out a "profile conversion" process to convert the data obtained from the "profile reverse conversion" process of step S206 converting into the color space of the one of the company image output apparatuses G1 to Gn into the PCS image data (step S207). In a case where the currently determined one of the company image output apparatuses G1 to Gn is the one concerning the re-selection and thus is different from the one first selected by the user, the image data becomes the image data close to the colors that would be obtained when printing were carried out using the one of the company image output apparatuses G1 to Gn first selected by the user by this "profile conversion" process. This is because in this case where the currently determined one of the company image output apparatuses G1 to Gn is the one concerning the re-selection and thus is different from the one first selected by the user, the profile corresponding to the one of the company image output apparatuses G1 to Gn concerning the re-selection is used in the profile reverse conversion of step S206 whereas the color reference corresponding to the one of the company image output apparatuses G1 to Gn first selected by the user is used in the color reference conversion of step S205.

Next, the color conversion part 44 refers to the table of the color reference for converting a PCS into input colors (sRGB or AdobeRGB), carries out a "profile reverse conversion" process to generate RGB image data for preview, and sends the thus obtained preview image data to the data transmission part 45 (step S208).

The data transmission part 44 transmits the preview image data and the image data for outputting sent from the color conversion part 44 to the web server 31 (step S209).

In the above description, the web server 31 causes the user to confirm whether to permit the printing in step S106 of FIG. 8. However, in a case where the one of the company image output apparatuses G1 to Gn first designated by the user has been changed, it is also possible to determine, based on the color difference between the preview image before the change and the preview image after the change, whether to carry out the printing, without requesting the user to determine it.

Figure 10:
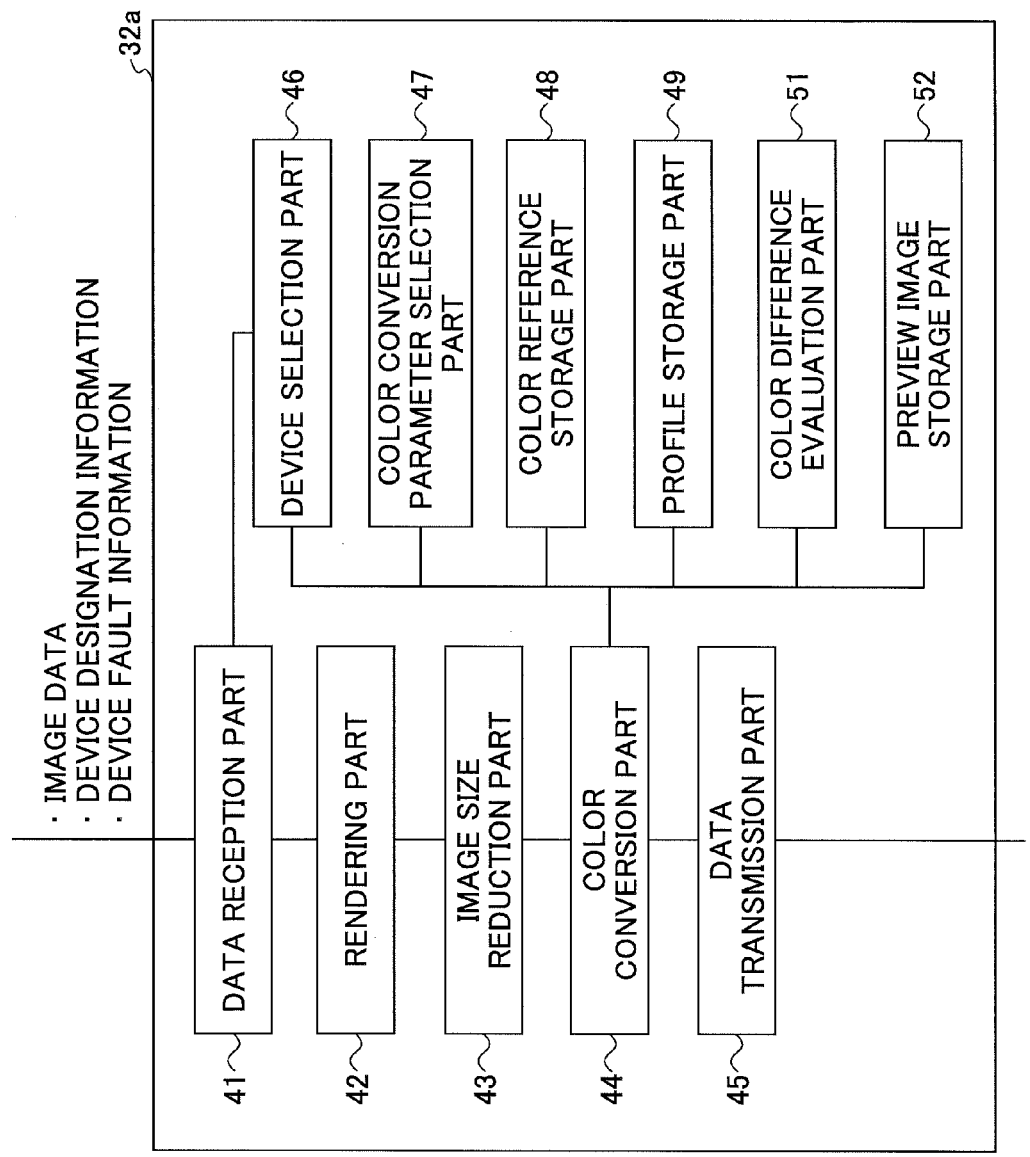
FIG. 10 shows a block configuration of another example of the image processing server.

In this case, the image processing server 32 has a configuration such as that 32a shown in FIG. 10. In FIG. 10, the same reference numerals are given to elements/components the same as those of FIG. 2, and duplicate description thereof will be omitted.

That is, an image processing server 32a shown in FIG. 10 includes a data reception part 41, a rendering part 42, an image size reduction part 43, a color conversion part 44, a data transmission part 45, a device selection part 46, a color conversion parameter selection part 47, a color reference storage part 48 and a profile storage part 49 the same as or similar to those of the image processing server 32 of FIG. 2. The image processing server 32a further includes a color difference evaluation part 51 and a preview image storage part 52.

The preview image storage part 52 includes a memory such as a random access memory (RAM). The image processing server 32a sends the PCS image data (the preview image data generated by the "profile conversion" process of step S207 of FIG. 9) which is the preview image (the preview image generated in step S102 of FIG. 8) first generated by the color conversion part 44 to the preview image storage part 52 and causes the preview image storage part 52 to store it.

It is noted that in a case where the user indicates not to permit the printing after seeing the preview image or a fault has occurred in the previously designated/selected one of the company image output apparatuses G1 to Gn, the preview image is again generated in step S105. In this case of generating the preview image of the selected alternative one of the previously designated/selected one of the company image output apparatuses G1 to Gn by the image processing server 32a, the color conversion part 44 sends the generated PCS image data (re-generated PCS image data) to the color difference evaluation part 51 when the PCS image data has been generated in step S207 of FIG. 9.

After thus receiving the PCS image data from the color conversion part 44, the color difference evaluation part 51 reads the PCS image data stored in the preview image storage part 52. Then, the color difference evaluation part 51 carries out color difference evaluation for the thus read PCS image data and the thus received PCS image data. In this color difference evaluation, since the PCI image data has information of L*a*b* values for each pixel, the color difference evaluation part 51 refers to the thus read PCS image data and the thus received PCS image data, calculates the color difference for each pixel therebetween, and calculates the average color difference of the entirety of the image.

When the calculated average color difference is less than or equal to a predetermined value (for example, less than or equal to 1), the color difference evaluation part 51 determines that the printing can be carried out with approximately the same colors, even in a case of carrying out the output using the alternative one of the one of the company image output apparatuses G1 to Gn first designated by the user, as those of the case of carrying out the output using the one of the company image output apparatuses G1 to Gn first designated by the user. Thus, the color difference evaluation part 51 sends flag information indicating that the color difference between the preview images is less than or equal to the predetermined value to the color conversion part 44 instead of sending the image data. After receiving this flag information, the color conversion part 44 sends the flag information to the data transmission part 45 instead of sending the preview image data. The data transmission part 45 sends the flag information to the web server 31. After receiving the flag information, the web server 31 does not transmit the preview image data to the one of the user terminals U1 to Um of the user, does not request the user to confirm whether to permit the printing, and sends an instruction to start the printing to the alternative one of the one of the company image output apparatuses G1 to Gn first designated by the user.

On the other hand, when the calculated average color difference is greater than the predetermined value, the color difference evaluation part 51 determines that in a case of carrying out the output using the alternative one of the one of the company image output apparatuses G1 to Gn first designated by the user, printing may be made with the colors different from those of the case of carrying out the output using the one of the company image output apparatuses G1 to Gn first designated by the user. The color difference evaluation part 51 then sends the re-generated PCS image data to the color conversion part 44. After receiving the re-generated PCS image data, the color conversion part 44 refers to the table of the color reference for converting a PCS into input colors and generates a preview image as described above, and transmits the preview image to the web server 31 via the data transmission part 45. After receiving the preview image, the web server 31 transmits the preview image to the one of the user terminals U1 to Um which has sent the job, causes the user terminal to display the preview image using the web browser, and transmits a message to the user terminal to request the user to confirm whether to permit to start printing, as described above using FIG. 8. The process is proceeded to step S106 of FIG. 8, and processing the same as or similar to that described above is carried out starting from step S106 of determining whether to carry out the printing in FIG. 8 (steps S106-S110, and steps S104-S105).

It is noted that this processing starting from step S106 includes, when step S105 is again carried out as a result of the determination result of step S107 being YES and an alternative company image output apparatus being selected in step S104, the above-described processing starting from the color difference evaluation carried out by the color difference evaluation part 51.

Figure 11:
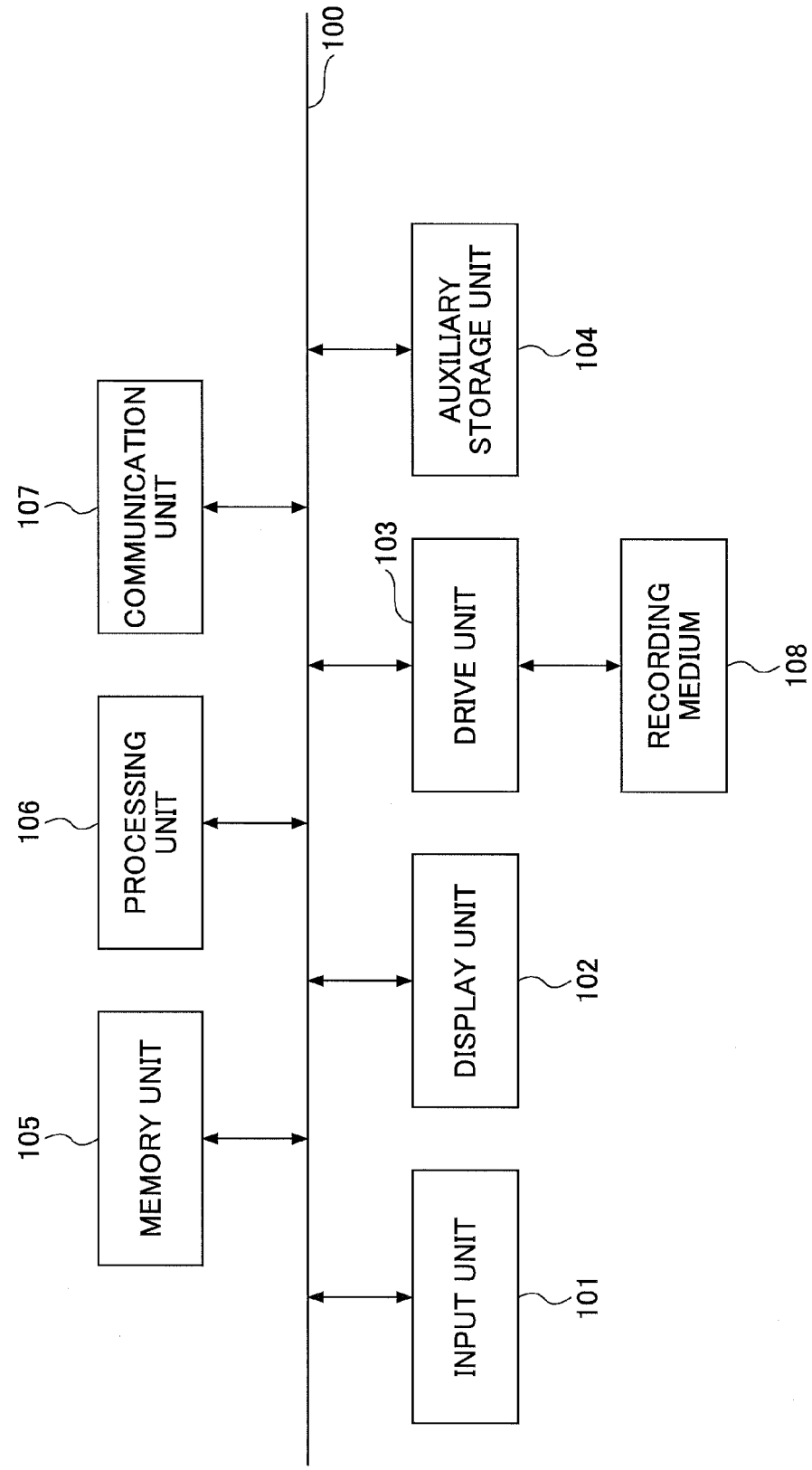
FIG. 11 shows a block configuration of one example of a hardware configuration of each one of a web server, the image processing server and a fault detection server.

FIG. 11 shows a block configuration of one example of a hardware configuration of each one of the web server 31, image processing server 32 and fault detection server 33.

For example, the image processing server 32 includes an input unit 101, a display unit 102, a drive unit 103, an auxiliary storage unit 104, a memory unit 105, a processing unit (CPU) 106 and a communication unit 107. These units are connected together via a bus 100.

The input unit 101 includes a keyboard, a mouse and/or the like, and is used to input various signals or the like. The display unit 102 includes a LCD or the like, and is used to display various data or the like.

The drive unit 103 is used to write information to and read information from a computer readable information recording medium 108. Specific examples of the computer readable information recording medium 108 include a ROM, an electrically erasable and programmable read-only memory (EEPROM), an EPROM, a flash memory, a flexible disk, a compact disc read-only memory (CD-ROM), a compact disk rewritable (CD-RW), a digital versatile disk (DVD), a secure digital (SD) card, a magneto-optical disc (MO) and so forth. A program(s) and/or data are written into and read from the computer readable information recording medium 108 by the drive unit 103.

The auxiliary storage unit 104 includes a hard disk or the like. The program(s) and data read out from the computer readable information recording medium 108 via the drive unit 103 can be stored in the auxiliary storage unit 104.

The memory unit 105 includes a ROM storing a program(s) and/or the like to be used by the processing unit 106 when the processing unit 106 carries out various processes; and a RAM to be used as a work area to be used by the processing unit 106 when the processing unit 106 carries out various processes.

The processing unit 106 controls the entirety of the image processing server 32. The communication unit 107 includes a NIC, a modem and/or the like, and is used to connect the image processing server 32 with the web serve 31, the fault detection server 33 and the Internet IN.

The web server 31 and fault detection server 33 have hardware configurations, and each thereof is the same as or similar to the hardware configuration of the image processing server 32 described above.

In a case where the web server 31, the image processing server 32 and the fault detection server 33 have such hardware configurations as those described above using FIG. 11, the respective processing parts thereof read the image processing control programs from the respective computer readable information recording media, and introduce the image processing control programs for carrying out the image processing control method in the respective memory units or the respective auxiliary storage units. By thus introducing the image processing control programs, the web server 31, the image processing server 32 and the fault detection server 33 perform as the image processing apparatus that carries out the image processing control method of carrying out image processing such that uniformity of colors is ensured even when images are output by output apparatuses having different image reproduction elements such as different image output methods of the output apparatuses, output media and/or the like.

It is noted that in the above description, the web server 31, the image processing server 32 and the fault detection server 33 are separate servers. However, a single image processing apparatus may have the respective functions of the web server 31, the image processing server 32 and the fault detection server 33. Further, the web server 31, the image processing server 32 and the fault detection server 33 are connected with the Internet IN. However, the present invention is not limited to such a system connected with the Internet IN. The web server 31, the image processing server 32 and the fault detection server 33 may be connected with one of the LAN 10 of the user side and the LAN 20 of the company side.

Thus, the printing system 1 according to the first embodiment includes the data reception part 41 and the data transmission part 45 of the image processing server 32 and the web server 31 as a communication part which are connected with the user terminals U1 to Um (an image output request apparatus) and the plural company image output apparatuses G1 to Gn (plural image output apparatuses) and carry out communication therewith. The printing system 1 further includes the profile storage part 49 of the image processing server 32 which stores, as profile information, color gamuts of output images at least determined by image output methods of the plural company image output apparatuses G1 to Gn and output media. The printing system 1 further includes the color reference storage part 48 of the image processing server 32 which stores plural sets of color reference data that associate the color gamuts of image data given by the user terminals U1 to Um with the color gamuts of output images that are output by the company image output apparatuses G1 to Gn which output the image data. The printing system 1 further includes the fault detection server 33 (an image output possibility determination part) which determines whether it is possible to output the image data received from one of the user terminals U1 to Um by one of the company image output apparatuses G1 to Gn. The printing system 1 further includes the device selection part 46 of the image processing server 32 (an output apparatus determination part) which determines, based on an instruction given by the one of the user terminal U1 to Um, the one of the company image output apparatuses G1 to Gn which outputs the image data that the web server 31 and the data reception part 41 have received from the one of the user terminals U1 to Um. Then, when the fault detection server 33 has determined that outputting by the thus determined one of the company image output apparatuses G1 to Gn is not possible, the device selection part 46 determines another one of the company image output apparatuses G1 to Gn as one of the company image output apparatuses G1 to Gn which outputs the image data. The printing system 1 further includes the rendering part 42, the image size reduction part 43, the color conversion parameter selection part 47 and the color conversion part 44 (a data generation part) which generate, from the image data, a preview image for an image output result of the determined one of the company image output apparatuses G1 to Gn and image data for outputting to be used to output the image data by the determined one of the company image output apparatuses G1 to Gn, based on the image data given by the one of the user terminals U1 to Um, the profile information of the determined one of the company image output apparatuses G1 to Gn which outputs the image data and the color reference data. The printing system 1 further includes the data transmission part 45 and the web server 31 (a transmission control part) which control a transmission of the generated preview image to the one of the user terminals U1 to Um and a transmission of the generated image data for outputting to the determined one of the company image output apparatuses G1 to Gn.

Thus, even when the previously determined one of the company image output apparatuses G1 to Gn has been changed, another one of the company image output apparatuses G1 to Gn having the same or similar profile information can be selected as one to output the image data. Then, an output image can be generated under the condition where the user can check. Thus, it is possible to ensure uniformity of colors even when an image is output from one of the company image output apparatuses G1 to Gn having a different color reproduction element(s) such as a different image output method of the company image output apparatus, a different output medium and/or the like.

Further, the printing system 1 according to the first embodiment carries out an image processing control method that includes carrying out communication by the data reception part 41 and the data transmission part 45 of the image processing server 32 and the web server 31 with the user terminals U1 to Um and the plural company image output apparatuses G1 to Gn. The image processing control method further includes storing, in the profile storage part 49 of the image processing server 32, as profile information, color gamuts of output images at least determined by image output methods of the plural company image output apparatuses G1 to Gn and output media. The image processing control method further includes storing, in the color reference storage part 48 of the image processing server 32, plural sets of color reference data that associate the color gamuts of image data given by the user terminals U1 to Um with the color gamuts of output images that are output by the company image output apparatuses G1 to Gn which output the image data. The image processing control method further includes determining, by the fault detection server 33, whether it is possible to output the image data received from one of the user terminals U1 to Um by one of the company image output apparatuses G1 to Gn. The image processing control method further includes determining, by the device selection part 46 of the image processing server 32, based on an instruction given by the one of the user terminal U1 to Um, the one of the company image output apparatuses G1 to Gn which outputs the image data that the web server 31 and the data reception part 41 have received from the one of the user terminals U1 to Um. Then, when the fault detection server 33 has determined that outputting by the thus determined one of the company image output apparatuses G1 to Gn is not possible, the device selection part 46 determines another one of the company image output apparatuses G1 to Gn one of the company image output apparatuses G1 to Gn which outputs the image data. The image processing control method further includes generating, by the rendering part 42, the image size reduction part 43, the color conversion parameter selection part 47 and the color conversion part 44, from the image data, a preview image for an image output result of the determined one of the company image output apparatuses G1 to Gn and image data for outputting to be used to output the image data by the determined one of the company image output apparatuses G1 to Gn, based on the image data given by the one of the user terminals U1 to Um, the profile information of the determined one of the company image output apparatuses G1 to Gn which outputs the image data and the color reference data. The image processing control method further includes controlling, by the data transmission part 45 and the web server 31, a transmission of the generated preview image to the one of the user terminals U1 to Um and a transmission of the generated image data for outputting to the determined one of the company image output apparatuses G1 to Gn.

Thus, even when the previously determined one of the company image output apparatuses G1 to Gn has been changed, an output image can be generated under the condition where the user can check it. Thus, it is possible to ensure uniformity of colors even when an image is output from one of the company image output apparatuses G1 to Gn having a different color reproduction element(s) such as a different image output method of the company image output apparatus, a different output medium and/or the like.

Further, the printing system 1 according to the first embodiment is realized as a result of a computer (or a processor(s)) executing an image processing control program that is stored in a computer readable information recording medium. The image processing control program, when executed by the computer (or processor(s)), performs a communication process of carrying out communication by the data reception part 41 and the data transmission part 45 of the image processing server 32 and the web server 31 with the user terminals U1 to Um and the plural company image output apparatuses G1 to Gn. The image processing control program, when executed by the computer (or processor(s)), further performs a profile storage process of storing, in the profile storage part 49 of the image processing server 32, as profile information, color gamuts of output images at least determined by image output methods of the plural company image output apparatuses G1 to Gn and output media. The image processing control program, when executed by the computer (or processor(s)), further performs a color reference storage process of storing, in the color reference storage part 48 of the image processing server 32, plural sets of color reference data that associate the color gamuts of image data given by the user terminals U1 to Um with the color gamuts of output images that are output by the company image output apparatuses G1 to Gn which output the image data. The image processing control program, when executed by the computer (or processor(s)), further performs an image output possibility determination process of determining, by the fault detection server 33, whether it is possible to output the image data received from one of the user terminals U1 to Um by one of the company image output apparatuses G1 to Gn. The image processing control program, when executed by the computer (or processor(s)), further performs an output apparatus determination process of determining, by the device selection part 46 of the image processing server 32, based on an instruction given by the one of the user terminal U1 to Um, the one of the company image output apparatuses G1 to Gn which outputs the image data that the web server 31 and the data reception part 41 have received from the one of the user terminals U1 to Um. Then, when it has been determined by the fault detection server 33 that outputting by the thus determined one of the company image output apparatuses G1 to Gn is not possible, another one of the company image output apparatuses G1 to Gn is determined by the device selection part 46 as one of the company image output apparatuses G1 to Gn which outputs the image data. The image processing control program, when executed by the computer (or processor(s)), further performs a data generation process of generating, by the rendering part 42, the image size reduction part 43, the color conversion parameter selection part 47 and the color conversion part 44, from the image data, a preview image for an image output result of the determined one of the company image output apparatuses G1 to Gn and image data for outputting to be used to output the image data by the determined one of the company image output apparatuses G1 to Gn, based on the image data given by the one of the user terminals U1 to Um, the profile information of the determined one of the company image output apparatuses G1 to Gn which outputs the image data and the color reference data. The image processing control program, when executed by the computer (or processor(s)), further performs a transmission control process of controlling, by the data transmission part 45 and the web server 31, a transmission of the generated preview image to the one of the user terminals U1 to Um and a transmission of the generated image data for outputting to the determined one of the company image output apparatuses G1 to Gn.

Thus, even when the previously determined one of the company image output apparatuses G1 to Gn has been changed, an output image can be generated under the condition where the user can check it. Thus, it is possible to ensure uniformity of colors even an image is output from one of the company image output apparatuses G1 to Gn having a different color reproduction element(s) such as a different image output method of the company image output apparatus, a different output medium, and/or the like.

Further, in the printing system 1 according to the first embodiment, the image processing server 32 has the preview image storage part 52 (image storage part) that stores the preview image generated corresponding to the first one of the company image output apparatuses G1 to Gn to output the image data. Then, when a new one of the company image output apparatuses G1 to Gn has been determined, a preview image for an image output result of the new one of the company image output apparatuses G1 to Gn and image data for outputting to be used for an image output by the new one of the company image output apparatuses G1 to Gn are again generated (re-generated), based on the profile information of the new one of the company image output apparatuses G1 to Gn and the color reference data of the first one of the company image output apparatuses G1 to Gn. The thus re-generated preview image and the first preview image are given to the web server 31. The web server 31 transmits the re-generated preview image and the first preview image to the one of the user terminals U1 to Um. Then, after receiving a printing permission response from the one of the user terminals U1 to Um, the re-generated image data for outputting is transmitted to the new one of the company image output apparatuses G1 to Gn via the web server 31. That is, in this case, the image processing server 32 uses the color reference of the first one of the company image output apparatuses G1 to Gn for outputting the image data, for which the preview image data stored in the preview image storage part 52 has been generated, as a starting point and color conversion is carried out for the new one of the company image output apparatuses G1 to Gn for outputting the image data.

Thus, it is possible to compare the image output state that the user has first aimed at and the image output state after the change of the one of the company image output apparatuses G1 to Gn, and determine whether to permit the image output (printing). Thus, it is more positively possible to ensure uniformity of colors even when an image is output from one of the company image output apparatuses G1 to Gn having a different color reproduction element(s) such as a different image output method of the company image output apparatus, a different output medium and/or the like.

Further, in the printing system 1 according to the first embodiment, the image processing server 32 has the color difference evaluation part 51 which compares, when the fault detection server 33 has determined that it is not possible to output an image, the color difference between the first preview image and the preview image generated for the new one of the company image output apparatuses G1 to Gn after the determination with a predetermined value, and evaluates the color difference. When the color difference evaluation part 51 determined from the evaluation that the color difference is less than or equal to the predetermined value, the web server 31 prevents the preview image from being transmitted to the one of the user terminals U1 to Um and transmits the image data for outputting to the new one of the company image output apparatuses G1 to Gn.

Thus, without requesting the user to carry out a check, it is possible to appropriately ensure uniformity of colors even when an image is output from one of the company image output apparatuses G1 to Gn having a different color reproduction element(s) such as a different image output method of the company image output apparatus, a different output medium and/or the like.

Further, in the printing system 1 according to the first embodiment, the color reference storage part 48 stores the color references for the respective groups of the company image output apparatuses G1 to Gn classified based on the chromaticity values of the primary colors and the secondary colors of the plural company image output apparatuses G1 to Gn.

Thus, in a case where one of the company image output apparatuses G1 to Gn has been changed, it is possible to quickly and appropriately select another one of the company image output apparatuses G1 to Gn having the same or similar profile information as one to be used to output an image, and generate an output image. Thus, it is possible to quickly and appropriately ensure uniformity of colors even when an image is output from one of the company image output apparatuses G1 to Gn having a different color reproduction element(s) such as a different image output method of the company image output apparatus, a different output medium and/or the like.

Thus, it is possible to provide an image processing apparatus, an image output system, an image processing control method and a computer readable information recording medium, by which it is possible to ensure uniformity of colors even when an image is output by an image output apparatus that has a different color reproduction element such as a different image output method, a different output medium and/or the like.

The image processing apparatus, image output system, image processing control method and computer readable information recording medium have been described above by the preferable embodiment. However, the present invention is not limited to the embodiment, and variations and modifications may be made without departing from the scope of the present invention.

The present application is based on Japanese Priority Application No. 2011-279231 filed Dec. 21, 2011, the entire contents of which are hereby incorporated herein by reference.

What is claimed is:
1. An information processing apparatus comprising:
a communication part that is connected with an image output request apparatus and plural image output apparatuses and carries out communication with the image output request apparatus and the plural image output apparatuses;
a profile storage part that stores, as profile information, color gamuts of output images determined by at least image output methods of the plural image output apparatuses and output media;
a color reference storage part that stores plural sets of color reference data for associating a color gamut of image data from the image output request apparatus with a color gamut of an output image that is output by one of the image output apparatuses which outputs the image data;
an image output possibility determination part that determines whether it is possible to output the image data received from the image output request apparatus by the one of the image output apparatuses;
an output apparatus determination part that determines, based on an instruction given by the image output request apparatus, the one of the image output apparatuses which outputs the image data that the communication part has received from the image output request apparatus, wherein when the image output possibility determination part has determined that outputting by the one of the image output apparatuses is not possible, the output apparatus determination part determines another one of the image output apparatuses as one which outputs the image data;

a data generation part that generates, from the image data, a preview image for an image output result of the determined one of the image output apparatuses and image data for outputting to be used to output the image data by the determined one of the image output apparatuses, based on the image data given by the image output request apparatus, the profile information of the determined one of the image output apparatuses to output the image data and the color reference data; and a transmission control part that controls a transmission of the preview image to the image output request apparatus and a transmission of the image data for outputting to the determined one of the image output apparatuses.

2. The image processing apparatus as claimed in claim 1, wherein the data generation part includes an image storage part that stores the preview image generated corresponding to a first one of the image output apparatuses to output the image data, when a new one of the image output apparatuses has been determined by the output apparatus determination part, the data generation part generates from the image data, a preview image for an image output result of the new one of the image output apparatuses and image data for outputting to be used for an image output by the new one of the image output apparatuses, based on the profile information of the new one of the image output apparatuses and the color reference data of the first one of the image output apparatuses, and gives the generated preview image and the first preview image to the transmission control part, and the transmission control part causes the communication part to transmit the generated preview image and the first preview image to the image output request apparatus, and then, after receiving a printing permission response from the image output request apparatus, the transmission control part causes the communication part to transmit the newly generated image data for outputting to the new one of the image output apparatuses.

3. The image processing apparatus as claimed in claim 2, further comprising a color difference evaluation part that compares, when the image output possibility determination part has determined that it is not possible to output an image, the color difference between the first preview image and the preview image generated by the data generation part for the new one of the image output apparatuses after the determination with a predetermined value, and evaluates the color difference, wherein when the color difference evaluation part has determined from the evaluation that the color difference is less than or equal to the predetermined value, the transmission control part prevents the preview image from being transmitted to the image output request apparatus and causes the communication part to transmits the image data for outputting to the new one of the image output apparatuses.

4. The image processing apparatus as claimed in claim 1, wherein the color reference storage part separately stores the color references for respective groups of the image output apparatuses classified based on chromaticity values of primary colors and secondary colors of the plural image output apparatuses.

5. An image output system comprising:

plural image output request apparatuses;

plural image output apparatuses; and the image processing system claimed in claim 1, wherein the plural image output request apparatuses, the plural image output apparatuses and the image processing apparatus are connected to a network, and when image data is sent to the image processing apparatus from one of the plural image output request apparatuses via the network, the image processing apparatus creates a preview image of the image data corresponding to one of the plural image output apparatuses, transmits the preview image to the one of the plural image output apparatus, creates image data for outputting from the image data and transmits the image data for outputting to the one of the plural image output apparatuses.

6. An image processing control method of an image processing apparatus comprising:

carrying out communication with an image output request apparatus and plural image output apparatuses with which the image processing apparatus is connected;

storing, in a profile storage part, as profile information, color gamuts of output images determined by at least image output methods of the plural image output apparatuses and output media;

storing, in a color reference storage part, plural sets of color reference data for associating a color gamut of image data from the image output request apparatus with a color gamut of an output image that is output by one of the image output apparatuses which outputs the image data;

determining whether it is possible to output the image data received from the image output request apparatus by the one of the image output apparatuses;

determining, based on an instruction given by the image output request apparatus, the one of the image output apparatuses which outputs the image data received from the image output request apparatus by the communication, and determining, when it has been determined by the determining whether it is possible to output the image data that outputting by the one of the image output apparatuses is not possible, another one of the image output apparatuses as one which outputs the image data;

generating, from the image data, a preview image for an image output result of the determined one of the image output apparatuses and image data for outputting to be used to output the image data by the determined one of the image output apparatuses, based on the image data given by the image output request apparatus, the profile information of the determined one of the image output apparatuses which outputs the image data and the color reference data; and controlling a transmission of the preview image to the image output request apparatus and a transmission of the image data for outputting to the determined one of the image output apparatuses.

7. A non-transitory computer readable information recording medium storing a program for causing a computer that acts as or controls operations of an image processing apparatus to execute an image processing control process comprising:

carrying out communication with an image output request apparatus and plural image output apparatuses with which the image processing apparatus is connected;

storing, in a profile storage part, as profile information, color gamuts of output images determined by at least image output methods of the plural image output apparatuses and output media;

storing, in a color reference storage part, plural sets of color reference data for associating a color gamut of image data from the image output request apparatus with a color gamut of an output image that is output by one of the image output apparatuses which outputs the image data;

determining whether it is possible to output the image data received from the image output request apparatus by the one of the image output apparatuses;

determining, based on an instruction given by the image output request apparatus, the one of the image output apparatuses which outputs the image data received from the image output request apparatus by the communication, and determining, when it has been determined by the determining whether it is possible to output the image data that outputting by the one of the image output apparatuses is not possible, another one of the image output apparatuses as one which outputs the image data;

generating, from the image data, a preview image for an image output result of the determined one of the image output apparatuses and image data for outputting to be used to output the image data by the determined one of the image output apparatuses, based on the image data given by the image output request apparatus, the profile information of the determined one of the image output apparatuses which outputs the image data and the color reference data; and controlling a transmission of the preview image to the image output request apparatus and a transmission of the image data for outputting to the determined one of the image output apparatuses.

* * * * *